United States Patent
Burrows et al.

(10) Patent No.: US 7,149,801 B2
(45) Date of Patent: Dec. 12, 2006

(54) MEMORY BOUND FUNCTIONS FOR SPAM DETERRENCE AND THE LIKE

(75) Inventors: Michael Burrows, Palo Alto, CA (US); Martin Abadi, Palo Alto, CA (US); Mark Steven Manasse, San Francisco, CA (US); Edward P. Wobber, Menlo Park, CA (US); Daniel Ron Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 10/290,879

(22) Filed: Nov. 8, 2002

(65) Prior Publication Data

US 2004/0093371 A1 May 13, 2004

(51) Int. Cl.
*G06F 15/173* (2006.01)
*H04K 1/00* (2006.01)
(52) U.S. Cl. .................. 709/225; 713/201; 380/28
(58) Field of Classification Search .............. None
See application file for complete search history.

(56) References Cited

U.S. PATENT DOCUMENTS

| | | | |
|---|---|---|---|
| 5,432,852 A * | 7/1995 | Leighton et al. | 380/30 |
| 6,161,130 A | 12/2000 | Horvitz et al. | 709/206 |
| 6,192,114 B1 | 2/2001 | Council | 379/114 |
| 6,662,300 B1 * | 12/2003 | Peters | 713/182 |
| 2002/0120853 A1 * | 8/2002 | Tyree | 713/188 |
| 2003/0044003 A1 * | 3/2003 | Chari et al. | 380/28 |
| 2003/0172159 A1 * | 9/2003 | Schuba et al. | 709/225 |
| 2004/0003283 A1 * | 1/2004 | Goodman et al. | 713/201 |
| 2004/0030932 A1 * | 2/2004 | Juels et al. | 713/202 |
| 2004/0059951 A1 * | 3/2004 | Pinkas et al. | 713/202 |
| 2004/0068668 A1 * | 4/2004 | Lor et al. | 713/201 |

OTHER PUBLICATIONS

HashCash, http://cypherspace.org/~adam/hashcash/, Aug. 13, 2002, 4 pages.
Camran, http://www.camram.org/, Aug. 13, 2002, 5 pages.
Juels, A. et al., "Client Puzzles: A Cryptographic Defense Against Connection Depletion Attacks," *Proceedings of NDSS '99 (Networks and Distributed Security Systems)*, 1999, 151-165 and an abstract (1 page).
The CAPTCHA Project, "Telling Humans and Computers Apart (Automatically)," Aug. 13, 2002, 1 page.
Glassman, S. et al., "The Millicent Protocol for Inexpensive Electronic Commerce," *Fourth International World Wide Web Conference ("The Web Revolution")*, Boston, Massachusetts, Dec. 11-14, 1995, 21 pages.

(Continued)

Primary Examiner—Wen-Tai Lin
(74) Attorney, Agent, or Firm—Woodcock Washburn LLP

(57) ABSTRACT

A resource may be abused if its users incur little or no cost. For example, e-mail abuse is rampant because sending an e-mail has negligible cost for the sender. Such abuse may be discouraged by introducing an artificial cost in the form of a moderately expensive computation. Thus, the sender of an e-mail might be required to pay by computing for a few seconds before the e-mail is accepted. Unfortunately, because of sharp disparities across computer systems, this approach may be ineffective against malicious users with high-end systems, prohibitively slow for legitimate users with low-end systems, or both. Starting from this observation, we identify moderately hard, memory bound functions that most recent computer systems will evaluate at about the same speed, and we explain how to use them for protecting against abuses.

36 Claims, 6 Drawing Sheets

T1) A --> ISP: REQUEST DELIVERY OF EMAIL TO B
    ISP --> A: BOUNCE (W/ REF. TO T)

T2) A --> T: REQUEST TICKET
    T --> A: CHALLENGE & TICKET KIT

T3) A --> ISP: TRANSMIT TICKET

T4) ISP --> T: CANCEL TICKET
    T --> ISP: OK

T5) ISP --> B: DEPOSIT EMAIL FROM A INTO B'S INBOX

OTHER PUBLICATIONS

Abadi, M. et al., "Strengthening Passwords," *SRC Technical Note 1997-033*, Digital Equipment Corporation, Systems, Research Center, Sep./Dec. 1997, 12 pages.

Aggarwal, A. et al., "A model for hierarchical memory," In *Proceedings of the Nineteenth Annual ACM Symposium on Theory of Computing*, 1987, 305-314.

Cranor, L. et al., "Spam!", *Communications of the ACM*, 41(8):74-83, 1998.

Dwork, C. et al., "Pricing via Processing or Combatting Junk Mail," In *Advances in Cryptology CRYPTO '92*, 1999, 139-147.

Fiat, A. et al., "Rigorous time/space trade-offs for inverting functions," *SIAM Journal on Computing*, 29(34):790-803, Jun. 2000.

Flajolet, P. et al., "Random Mapping Statistics," In J-J. Quisquarter and J. Vandewalle, editors, *Advances in Cryptology EURO-CRYPT '89*, vol. 434 of *Lecture Notes in Computer Science*, 1990, 329-354.

Gabber, E. et al., "Curbing Junk E-Mail via Secure Classification," *Financial Cryptography*, 1998, 198-213.

Hellman, M., "A Cryptanalytic Time-Memory Trade Off," *IEEE Transactions on Information Theory*, IT-26(4):401-406, 1980.

Jakobsson, M. et al., "Proofs of Work and Bread Pudding Protocols," *Proceedings of the IFIP TC6 and TC11 Joint Working Conference on Communications and Multimedia Security (CMS '99)*, Kluwer, 1999, (15 pages).

Manber, U., "A Simple Scheme to Make Passwords Based on One-Way Functions Much Harder to Crack," *Computers & Security*, 15(2):171-176, 1996.

Menezes, A. et al., "Hash Functions and Data Integrity," *Handbook of Applied Cryptography*, Chapter 9, CRC Press, 1996, pp. 321-383.

* cited by examiner

MEMORY BOUND FUNCTIONS FOR SPAM DETERRENCE AND THE LIKE

CROSS-REFERENCE TO RELATED APPLICATION

The subject matter described herein is related to the subject matter disclosed in co-pending application Ser. No. 10/291,260, filed on Nov. 8, 2002, entitled "Ticket Server For Spam Prevention And The Like."

FIELD OF THE INVENTION

The present invention relates generally to the field of distributed computing and more particularly, but not exclusively, to systems and methods for reducing spam and/or other unwanted behavior on a computer network, such as the Internet. Still more particularly, the present invention relates to a system in which a memory bound function is employed to formulate a computational puzzle type of "challenge" in a system of the kind described in co-pending application Ser. No. 10/291,260, filed on Nov. 8, 2002, entitled "Ticket Server For Spam Prevention And The Like."

BACKGROUND OF THE INVENTION

A primary application of the present invention is to prevent/reduce spam, and therefore the following discussion of the background of the invention will focus on spam and methods of filtering it. (Other applications of the present invention include but are not limited to controlling account creations; controlling addurl at index/directory services (for adding a URL to an index or directory); controlling index mining; load control on free services such as stock quotes; preventing connection depletion attacks whereby a client requests access to a server in a malicious manner; and in strengthening passwords.) In addition, approaches such as digital postage, proof of work, and the like will be described. The Camram/Hashcash system is summarized at some length to set the stage for the subsequent description of the present invention. Further information about the approaches discussed below may be found in the references and at the websites (URLs) cited below. Paper copies of information relating to the Internet-based references cited below are being submitted herewith in an Information Disclosure Statement.

A. Spam

Electronic messaging, particularly electronic mail (e-mail) carried over the Internet, has become a preferred method of communication for many individuals and organizations. Unfortunately, e-mail recipients are increasingly being subjected to unsolicited and unwanted mass mailings. With the growth of Internet-based commerce, a wide and growing variety of electronic merchandisers is repeatedly sending unsolicited mail advertising their products and services to an ever expanding universe of e-mail recipients. For example, users of the Internet who merely provide their e-mail addresses in response to perhaps innocuous appearing requests for visitor information generated by various web sites, often find, later upon receipt of unsolicited mail and much to their displeasure, that they have been included on electronic distribution lists. This can have a negative effect on the users' experience and can diminish the productivity of users who receive such unwanted e-mail, or spam, at their place of business.

Once a recipient finds himself on an electronic mailing list, that individual can not readily, if at all, remove his address from it, thus effectively guaranteeing that he will continue to receive unsolicited mail. This occurs simply because the sender either prevents a recipient of a message from identifying the sender of that message (such as by sending mail through a proxy server) and hence precludes that recipient from contacting the sender in an attempt to be excluded from a distribution list, or simply ignores any request previously received from the recipient to be so excluded.

An individual can easily receive hundreds of pieces of unsolicited postal mail over the course of a year, or less. By contrast, given the extreme ease and insignificant cost through which electronic distribution lists can be readily exchanged and e-mail messages disseminated across extremely large numbers of addressees, a single e-mail addressee included on several distribution lists can expect to receive a considerably larger number of unsolicited messages over a much shorter period of time. Furthermore, while many unsolicited e-mail messages are benign, others, such as pornographic, inflammatory and abusive material, are highly offensive to their recipients. All such unsolicited messages collectively constitute so-called "junk" mail or "spam".

A rule based textual e-mail classifier, specifically one involving learned keyword-spotting rules, is described in W. W. Cohen, "Learning Rules that Classify E-mail," 1996 AAAI Spring Symposium on Machine Learning in Information Access, 1996. In this approach, a set of e-mail messages previously classified into different categories is provided as input to the system. Rules are then learned from this set in order to classify incoming e-mail messages into the various categories. At first blush, one might think to use a rule-based classifier to detect spam. Unfortunately, if one were to do so, the result could be quite problematic and disappointing. Rule-based classifiers suffer various deficiencies that, in practice, can severely limit their use in spam detection. First, spam detection systems typically require the user to manually construct appropriate rules to distinguish between interesting mail and spam. This is impractical for many e-mail recipients. Second, the characteristics of spam and non-spam e-mail may change significantly over time whereas rule-based classifiers are static (unless the user is constantly willing to make changes to the rules). In this regard, it is well known that mass e-mail senders ("spammers") routinely modify the content of their messages in a continual attempt to prevent recipients from setting up a filter to reject them.

Therefore, a need exists in the art for a different approach to reducing the amount of spam delivered to a recipient's in-box. One such approach involves the use of so-called proof of work postage stamps and client puzzles. These are discussed next.

B. Digital Postage, Proof of Work, Client Puzzles, etc.

Glassman, et al., have described the Millicent protocol for inexpensive electronic commerce. World Wide Web Journal, Fourth International World Wide Web Conference Proceedings, pages 603–618. O'Reilly, December 1995. See also, http://www.w3.org/Conferences/WWW4/Papers/246/. Briefly, Millicent is a secure protocol for e-commerce over the Internet, designed to support purchases costing less than a penny. It is based on decentralized validation of electronic cash at the vendor's server without any additional communication, expensive encryption, or off-line processing. Key aspects of Millicent are its use of brokers and of scrip. Brokers take care of account management, billing, connection maintenance, and establishing accounts with vendors.

Scrip is digital cash that is only valid for a specific vendor. The vendor locally validates the scrip to prevent customer fraud, such as double spending.

Dwork, et al. have suggested that a way to discourage spam is to force senders of e-mail to pay for the privilege by performing a computation. Cynthia Dwork and Moni Naor, "Pricing via processing or combating junk mail," Advances in Cryptology—CRYPTO '92, pp. 139–147. Independently, Adam Back later proposed Hash Cash for use in protecting mailing lists. See http://cypherspace.org/~adam/hashcash/. (Hashcash is a proof of work "coin", and is based on a mathematical puzzle that is hard to solve but is easy to verify it was solved correctly.) There have also been proposals to use Hash Cash to deter junk e-mail. See http://www.camram.org. The Camram approach is described in further detail below. Others have proposed using computational puzzles to discourage attacks on servers. See http://www.rsasecurity.com/rsalabs/staff/bios/ajuels/publications/client-puzzles/. Captcha is a project that creates puzzles that can be solved only by humans, for the purpose of telling humans and computers apart over a network. (Captcha stands for Completely Automated Public Turing Test to Tell Computers and Humans Apart.) Typically the puzzles involve having the user read a sequence of characters from a visually cluttered image. Further information can be found at www.captcha.net.

Camram, cited above, is an anti-spam system utilizing an electronic peer-to-peer model of postage, using proof of work and digital signature techniques. The Camram system intentionally provides enough information to allow intermediate machines to filter spam. The basic idea can be summarized as follows: If an e-mail message does not have an electronic postage stamp, it will not be allowed into the recipient's mailbox. Whenever a sender transmits e-mail to an intended recipient, an electronic postage stamp will be generated. Unlike physical postage, the sender does not spend money but instead spends time by solving a puzzle, the solution to which becomes a postage stamp. The theory is that the economics of spam changes when e-mail is required to have postage. A single postage stamp is not hard to create. Spammers, however, count on being able to send thousands or hundreds of thousands, or more, of messages very quickly and if they need to calculate postage stamps for every message, it will slow them down and consume CPU resources. Making spam more expensive in this manner is intended to discourage spammers from operating. Another advantage to putting electronic postage on e-mail is that it can also be used as a key for filtering out spam. As discussed above, ordinary filtering techniques may not work well for a variety of reasons. Thus, by adding an easily detectable and verifiable postage stamp, users would be able to filter out e-mail that does not have this postage stamp.

FIG. 1A depicts the normal relationship between a mail server and an ordinary POP-3 user. The user reads or creates messages via the message user interface (UI). When sending a message, the message is handed to a delivery agent that communicates with the mail server at the ISP. Receiving messages is basically the reverse process. When the user tells the message UI to grab a message, the delivery agent fetches e-mail via POP-3 and stores it locally in local mailboxes. The message UI then reads the local mailboxes and displays the messages.

FIG. 1B depicts a scenario in which Camram is employed. Outbound, the message is passed through Camram before being handed to the delivery agent. The Camram module then creates all additional headers and any necessary alterations to the message before passing the message to the delivery agent for delivery. When receiving a message, Camram again sits between the delivery agent and the message UI. In this case, Camram will examine each message and put it in the local mailbox if it passes one of three challenges: 1) hashcash coin, 2) digital signature, 3) being from someone on the white list. If the message fails to pass one of those three hurdles, Camram will put the message in "Camram jail" and send a response back to the message originator. If that message bounces, then the message triggering the auto response message would be deleted along with the bounce message.

An alternative solution has also been proposed. This alternative is a proxy containing Camram functionality running on the user's machine, as shown in FIG. 1C. In this proxy model, the user's e-mail client would connect to the proxy on the user's machine. The proxy would intercept all e-mail coming and going. On e-mail outbound, it would perform the appropriate hashcash and signature stamping of the mail. On e-mail inbound, it would perform the appropriate filtering and redirection of e-mail.

It has also been suggested that, at the enterprise or service provider level, Camram will not impact operations significantly; and that, as Camram adoption increases, the service provider is given an opportunity to further increase the cost of spamming to spammers and open relays, by rejecting messages that do not contain Camram postage.

The above-cited co-pending application Ser. No. 10/291,260, filed on Nov. 8, 2002, entitled "Ticket Server For Spam Prevention And The Like," describes a system for reducing undesirable network traffic, such as spam. In an exemplary application of the invention, a "ticket server" receives ticket requests and responds thereto by issuing a complete ticket or a Ticket Kit comprising a challenge. If a Ticket Kit is issued, the client is able to construct a valid ticket from a correct answer to the challenge and the data in the Ticket Kit. A challenge is described as possibly including a CPU bound task, a memory bound task, a task that can be solved only by a human, or monetary payment.

Assume that a sender S wishes to send an e-mail message M to a recipient R. If the recipient R can determine that message M is almost certainly not spam, either by recognizing the sender's address as a being that of a friend or by some analysis of M, then M may be sent and received in the normal way. If S is not confident that R will accept the message, S may be instructed to compute some moderately-hard function F(M) and send the message and computed function, i.e., (M, F(M)), to R. The recipient R can verify that the communication is of the form (M, F(M)). If the verification succeeds, R can receive M and optionally allow future e-mail from S without the F( ) computation. Otherwise, R can "bounce" (reject) M, indicating in a bounce message where S can obtain software that will compute F(M).

The function F( ) is preferably chosen so that the sender S takes at least several seconds to perform the computation, but that the verification by the recipient R is at least a few, thousand times faster. Thus, people who wish to send e-mail to a recipient for the first time are discouraged from doing so, because they are forced to spend several seconds of CPU time. For a spammer, sending many millions of messages, this can become prohibitive.

One challenge with the system described above is that fast CPUs run much faster than slow CPUs: Consider a 2.2 GHz PC versus a 33 MHz PDA. If a computation takes a few seconds on a PC, it might take minutes on a PDA, which is unfortunate for PDA users. The computation could instead be done by a more powerful machine on behalf of the PDA, but we would prefer to avoid this complication where possible.

SUMMARY OF THE INVENTION

Accordingly, a goal of the present invention is to identify a candidate function F( ) that most computers evaluate at about the same speed. Our approach is to require F( ) to be memory bound, i.e., to make it access locations in a large region of memory in a random way, so that caches are ineffective. The ratios of memory latencies of machines built in the last few years are typically no greater than three, and almost always less than five. Our approach will work if the biggest caches are significantly smaller than the smallest memories among the machines to be used. This restriction may preclude some of the smallest machines, but the approach is still useful in equalizing the effective speeds of many machines. In addition to e-mail, techniques of this sort can be used to discourage abuse of other "free" services, examples of which include allocating accounts at web sites, submitting web pages to indexing services, sending queries to web information services such as search engines, and creating network connections.

Thus, in the description below, we have identified moderately hard functions that most recent computer systems will evaluate at about the same speed. Such functions can help in protecting against a variety of abuses. The uniformity of their cost across systems means that they need not inconvenience low-end, legitimate users in order to deter high-end attackers. We define a family of moderately hard functions whose computation can benefit crucially from accesses to a large table in memory.

For example, in one illustrative implementation of the present invention, a method involves the construction of a computational puzzle whose solution takes approximately the same amount of time on a plurality of computers having a range of processing power and cache sizes. The method includes the steps of identifying a computational puzzle having a solution which is best found by a computation whose speed is limited by memory latency; and communicating information about the computational puzzle to at least one of the computers so as to cause the at least one computer to solve the puzzle in a manner which incurs a computational cost within a predetermined range. Preferably, the solution of the puzzle causes the at least one computer to access a pseudo-random sequence of locations in a memory array, wherein the memory array is significantly larger than the largest cache generally available to the plurality of computers.

In another illustrative embodiment, the present invention provides a method for preventing abuse of a resource on a computer network. The method includes the steps of receiving a request for access to the resource from a client, and requiring the client to show that it has computed a predefined memory-bound function before providing access to the resource.

Other features of the present invention are described below.

DETAILED DESCRIPTION OF PREFERRED EMBODIMENTS

A. Overview

Figure 1A:
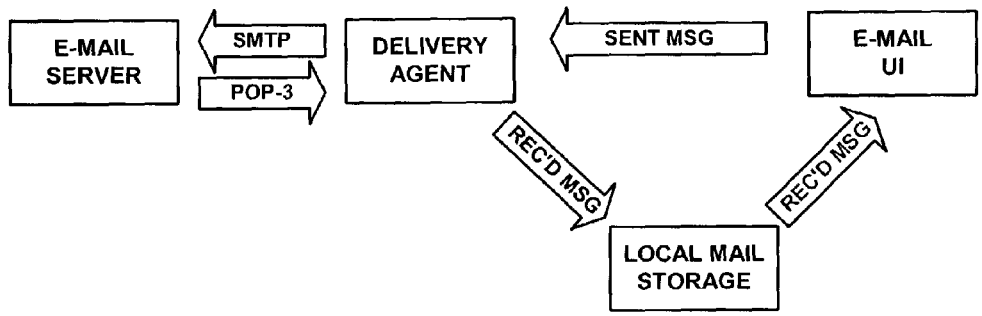
FIGS. 1A, 1B and 1C schematically depict a prior art e-mail service and the Camram system, discussed above, for preventing spam.
Figure 1B:
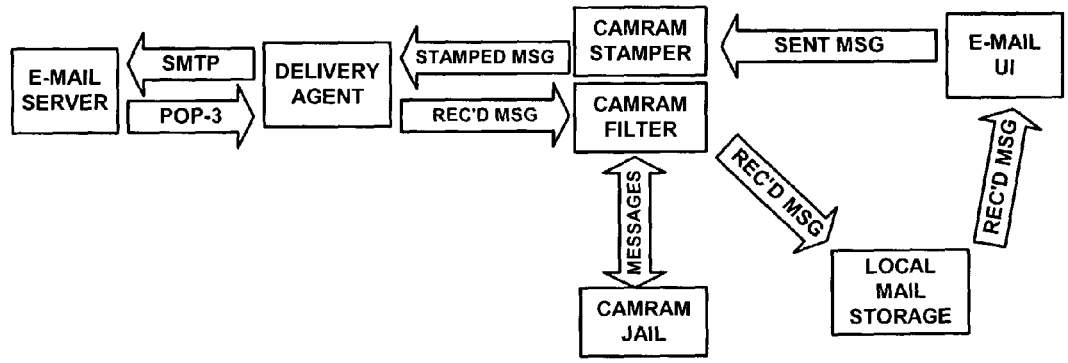
Figure 1C:
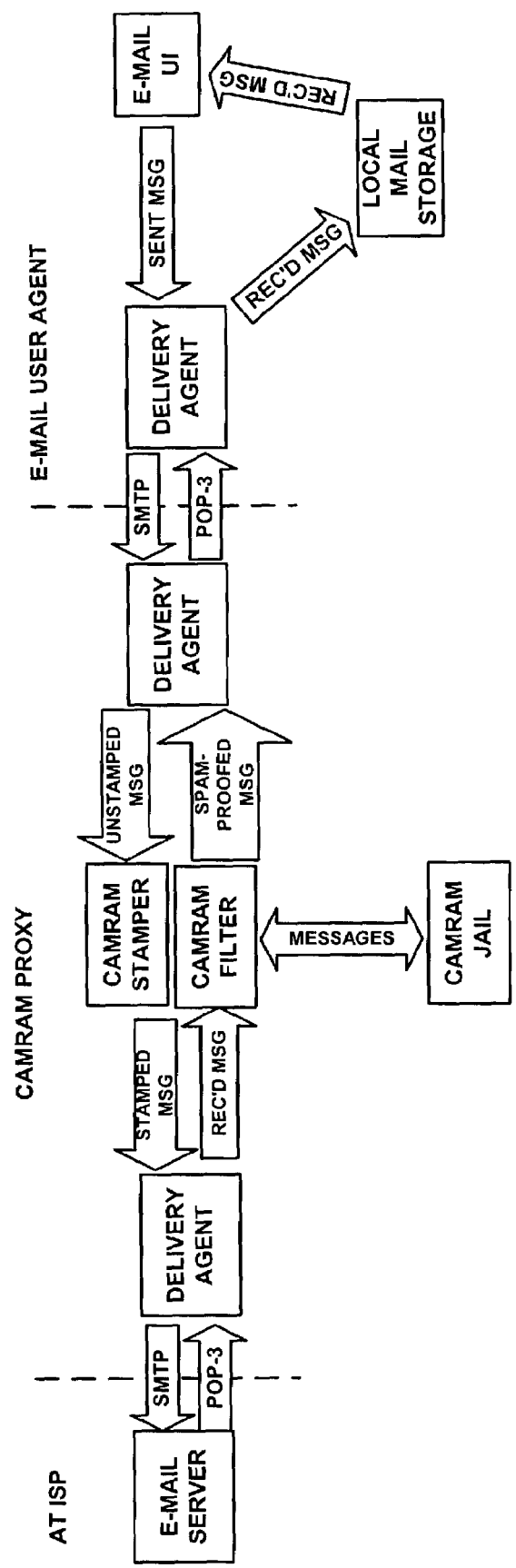

As discussed in the Background section above, it has been proposed that spam e-mail should be discouraged by forcing e-mail senders to pay for the privilege by performing a computation that has some cost associated with it. One can think of this as being analogous to placing a postage stamp on the e-mail before sending it. The Ticket Service concept of co-pending application Ser. No. 10/291,260, filed on Nov. 8, 2002 generalizes this idea of electronic postage, and acts as a broker between the sender and the receiver of e-mail. It provides computational puzzles for senders to solve, and then later checks that they have been solved correctly. The use of a centralized service allows the types of puzzle to be generalized in various ways. For example, the sender might be asked to perform a CPU bound task, a memory bound task, a task that can be solved only by a human, or to provide a method of monetary payment. In addition, the centralized service allows the receiver to indicate that a given e-mail is not in fact spam, and so the attached postage should be credited back to the sender.

In addition, the tickets produced by the Ticket Service may be used for things other than preventing spam e-mail. For example, one might use it to limit the rate at which web accounts are created, or at which requests to a web service (especially a free service, e.g., such as stock quotes) are submitted.

Several different currencies have been proposed for denominating e-mail "postage stamps". The Ticket Service provides a way to unify them, and to add additional functionality and flexibility.

At a high level, a Ticket Server provides a network service that can issue "tickets" and can verify and cancel previously issued tickets. A ticket may be implemented as a small binary value (e.g., in the range of about 500 bits), typically represented as a base-64 string so that it can readily be shipped through web pages, URLs, or e-mail messages. Tickets may be cryptographically protected so that they cannot be modified or forged, i.e., so that attempted modifications or forgeries can be detected and rejected. The Ticket Server will preferably issue tickets on request but only after the requester has done something to justify the issuance of the ticket. For example, the requestor can provide proof that he has performed some amount of computational work, or that the requestor has interacted with a human for this request; or the requester can present some form of pre-paid voucher, or "plain old" cash. In general, a request for a new ticket will result in a "challenge" from the Ticket Server; the correct response to this challenge will provide the requestor with the desired ticket. Tickets might have various values, or might be restricted to particular uses. When a ticket has been issued, it can be passed around (for example, with some request or attached to some e-mail). The recipient of a ticket can call the Ticket Server to verify and cancel the ticket, thereby making the originator pay for the request. The recipient can also credit the ticket back to the originator, making the request free. Overall, tickets behave quite like postage stamps.

Figure 2A:
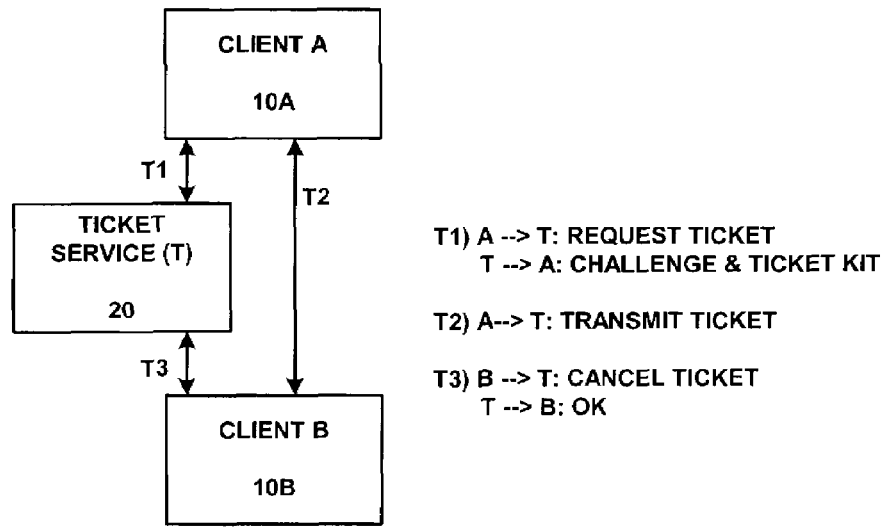
FIGS. 2A and 2B schematically depict exemplary Ticket Service systems.
Figure 2B:
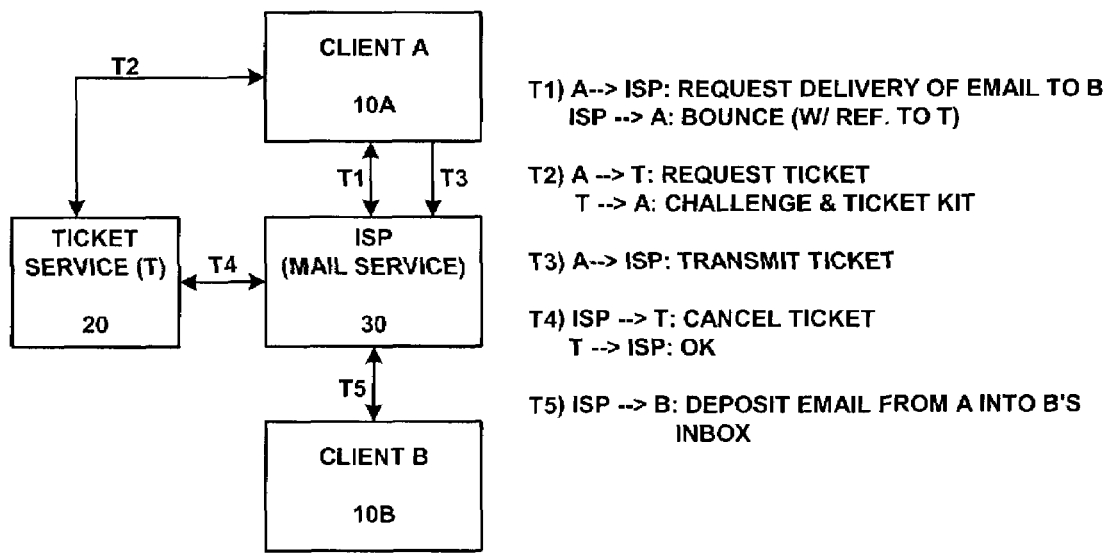

FIGS. 2A and 2B depict exemplary Ticket Service systems. In FIG. 2A, two clients, client "A" and client "B", denoted with reference numerals 10A and 10B, respectively, are shown, as is a Ticket Service "T", denoted with reference numeral 20. In FIG. 2B, an Internet Service Provider (ISP) 30, providing a mail service, is also shown. An explanation of how these systems operate, in terms of electronic transactions (requests and responses) between and among the clients and Ticket Service, is provided below.

We will now provide a more detailed description of presently preferred implementations of a memory bound function suitable for use in a Ticket Service or the like, and of a Ticket Service utilizing a memory bound function in accordance with the present invention. The invention, however, is by no means limited to these examples.

B. Memory Bound Functions

The following description of memory bound functions is organized in the following manner: Section B.1 provides an introduction, including an overview of certain issues to be addressed. The discussion here will lead to a procedure for constructing puzzles whose solutions take approximately the same amount of time on a wide range of computers, as well as the observation that the puzzle solutions are best found by a computation whose speed is limited by memory latency. Section B.2 presents some initial ideas concerning memory bound computations as well as a naive embodiment and an improvement involving chains. Section B.3 presents a complete method involving trees. Section B.4 presents certain refinements, including forgetting the challenge, dropping bits from challenges, and mixing functions. Section B.5 presents variants, including a non-interactive variant and the use of memory bound functions for strengthening passwords. Section B.6 describes in greater detail how a method may be instantiated. This includes a discussion concerning the choice of a function $F(\ )$ and setting of parameters, as well as random functions and approximations. Section B.7 provides a conclusion of the detailed discussion of memory bound functions.

B.1 Introduction

As discussed above, the present invention is particularly directed to providing an easily-verifiable, moderately-hard function that is memory bound, so that the difficulty of computing the function is similar on many different machine types. We wish to apply this to e-mail spam by forcing the sender S (e.g., client "A" in FIGS. 2A and 2B) to perform such a computation. The computation is verified either by the receiver R (e.g., client "B"), or by some agent that R trusts (e.g., Ticket Service "T"). Beyond combating spam, requiring moderately expensive computations can help in protecting against other abuses. For example, Web indexes could require a computation each time a user tries to add a URL to the index, thus limiting additions; a server could require a computation each time a client tries to establish a connection, thus countering connection-depletion attacks. See Ari Juels and John Brainard, Client puzzles: A cryptographic defense against connection depletion. Proceedings of NDSS '99 (Networks and Distributed Systems Security), pp. 151–165, 1999.

The approach we take is to force the sender S to access a pseudo-random sequence of locations in a large array, whose size is chosen to be significantly larger than the largest cache available. Let this array have $2^n$ entries, where n is a parameter. Let $F(\ )$ be a function whose domain and range are integers in the range $0 \ldots 2^n-1$. Suppose $F(\ )$ can be computed faster than a memory access but its inverse $F^{-1}(\ )$ cannot be evaluated in less time than a memory access. In the simplest arrangement, one could imagine that R could pick some value $x_0$, and find $x_L$ for some parameter L, where $x_{i+1}=F(x_i)$. (Note that R could be the intended recipient, such as client "B" in FIGS. 2A and 2B, or a trusted agent such as a Ticket Service "T".) Then R could challenge S to find $x_0$ given only $x_L$. As long as $F(\ )$ is chosen wisely, and $2^n$ is large enough, we would like the fastest approach for S to be to perform L non-sequential accesses into a table to evaluate $F^{-1}(\ )$ L times.

There are several problems here:
a) The chain of values produced by successive invocations of $F(\ )$ is likely to contain small cycles.
b) S could choose a random $x_j$ and, by applying $F(\ )$ L times, find the corresponding $x_{j+L}$. Then, by repeatedly applying $F(\ )$, S could cycle through the pairs $(x_{j+1}, x_{j+L+1})$, $(x_{j+2}, x_{j+L+2})$, ..., hoping to find a pair such that the second element is $x_L$. If it succeeds, the first element of the pair is the corresponding $x_0$. This approach uses little memory and could potentially run faster than an approach based on table lookup.
c) If $F(\ )$ is not a permutation, there will be many potential values of $x_0$, all of which produce $x_L$.
d) The ratio of the work done at S and R is the ratio in time between a memory access and computing $F(\ )$. This is unlikely to be more than 10, and should not be more than a hundred or so with present machines.
e) If R must pose the problem, S is unable to prepare a message to be sent to R without first contacting R.

We will briefly address these problems in turn:
a) and b) We change the recurrence to be:

$$x_{i+1}=F(x_i) \text{ xor (exclusive OR) } i$$

This eliminates cycles, and thwarts strategy (b). Many similar variations, in which step i depends on i, are possible.

c) and d) Although we could insist that $F(\ )$ be a permutation, we allow R to pick a function $F(\ )$, and not to worry that it is not a permutation. Using an $F(\ )$ that is not a permutation causes S to find branches in the reverse chain, and therefore to explore a tree of depth L rooted at $x_L$. One of the leaves of this tree is $x_0$. If $F(\ )$ is random and $L<2^n$, the size of the tree explored by S turns out to be quadratic in L, so if L is chosen to be a few thousand, S is forced to perform far more work than R even if it takes as long to compute $F(\ )$ as $F^{-1}(\ )$. This side-steps problem (c) while simultaneously solving problem (d), but presents a further problem: S does not know which of the many possible leaves corresponds to $x_0$; the number of leaves is linear in L. S could send all of them to R but this would add communication cost. A solution is for R to provide S with a checksum of the path from $x_0$ to $x_L$. This can be checked readily, but does not allow S to prune the space of leaves in advance of the tree search. To make the computation of the checksum fast, only a subset of the values on the path need be checksummed - - - for example, every $64^{th}$ value. Now that the problem has become a tree search, it is important that L be small compared to $2^n$; if it were not, S could batch the computations at a given level in the tree, and perhaps perform several lookups for each cache miss in the table of $F^{-1}(\ )$.

e) If R cannot pose a problem to S in advance of S sending M to R, then the problem can be defined as a function of M. An example strategy for doing this is as follows. One can require S to apply a cryptographic checksum to M, or certain parts thereof. Using the result as the seed to a cryptographic random number generator, S then generates a random F( ) and a start position $x_0$. S then finds the root $x_L$ for its tree search using the recurrence $x_{i+1}=F(x_i)$ xor i. Then R can demand that S supply a value for $x'_0$ such that $x'_0$ is a valid pre-image of $x_L$ under the recurrence and that some other property holds. An example of such a property might be that the checksum of the path (or subsequence of the path, as discussed above) from $x'_0$ to $x_L$ be 0 mod $2^m$ for some m. If $2^m$ is substantially smaller than L, it is very likely that such an $x'_0$ exists. If no such $x'_0$ exists, S can modify M in a trivial way and try again. If R verifies that the $x'_0$ presented by S has the right properties, R can be reasonably certain that S had to search a substantial fraction of the tree rooted at $x_L$.

Another question is what constitutes a suitable function F( ). We envision that a new F( ) will be chosen for each challenge, or small set of challenges. There are many possibilities now that we have removed the constraint that it be a permutation. One could make the function be random, by generating a table of size $2^n$ random n-bit entries. This has the disadvantage that in order to generate or check a problem solved by S, R must perform a sequence of random accesses in the array. Thus, R needs as much memory as S, and the ratio between the work done at S and R is the ratio between the size of the tree searched by S and the chain length L traversed by r. One could do better than this if F( ) can be computed more quickly than a table lookup.

One possibility is $F(x)$=middle n bits of the product $p[a]*p'[b]$ where the n-bit string representing x is the concatenation of the bit strings a and b which differ in length by at most 1, and the tables p[ ] and p'[ ] contain randomly chosen values. In some variants, p and p' are equal. In some variants, the elements of p[ ] and p'[ ] are chosen to be primes. (The use of primes makes it less likely that the same product will arise in more than one way, and so makes the number of collisions in F( ) closer to the number one would expect in a random function.) This function has the charm that the tables needed to compute F( ) are small ($O(2^{n/2})$) and so will fit in the cache, and the multiply is cheap on most processors. As required, inverting F( ) without a table of size $2^n$ is likely to take longer than a memory access time.

Simple functions derived from cryptographic functions may also be suitable. The use of randomly chosen F( ) functions means that there is considerable variance in the size of the tree searched by S. That is, although the expected amount of work done by S is quadratic in the chain length L, the size of any given problem may be smaller or greater than the mean by a considerable factor. We work around this effect by using not one chain/tree, but several smaller chains/trees using smaller values of L. Each of these smaller problems uses a different $x_0$ and possibly a different F( ). By increasing the number of problems, the variance in the difficulty of the set of problems can be reduced to an acceptable level.

In our experiments, the settings for the parameters were n=22, L=$2^{12}$. We imagine that a sender S might be asked to solve ten or more such problems to reduce the variance of the tree search.

Figure 2C:
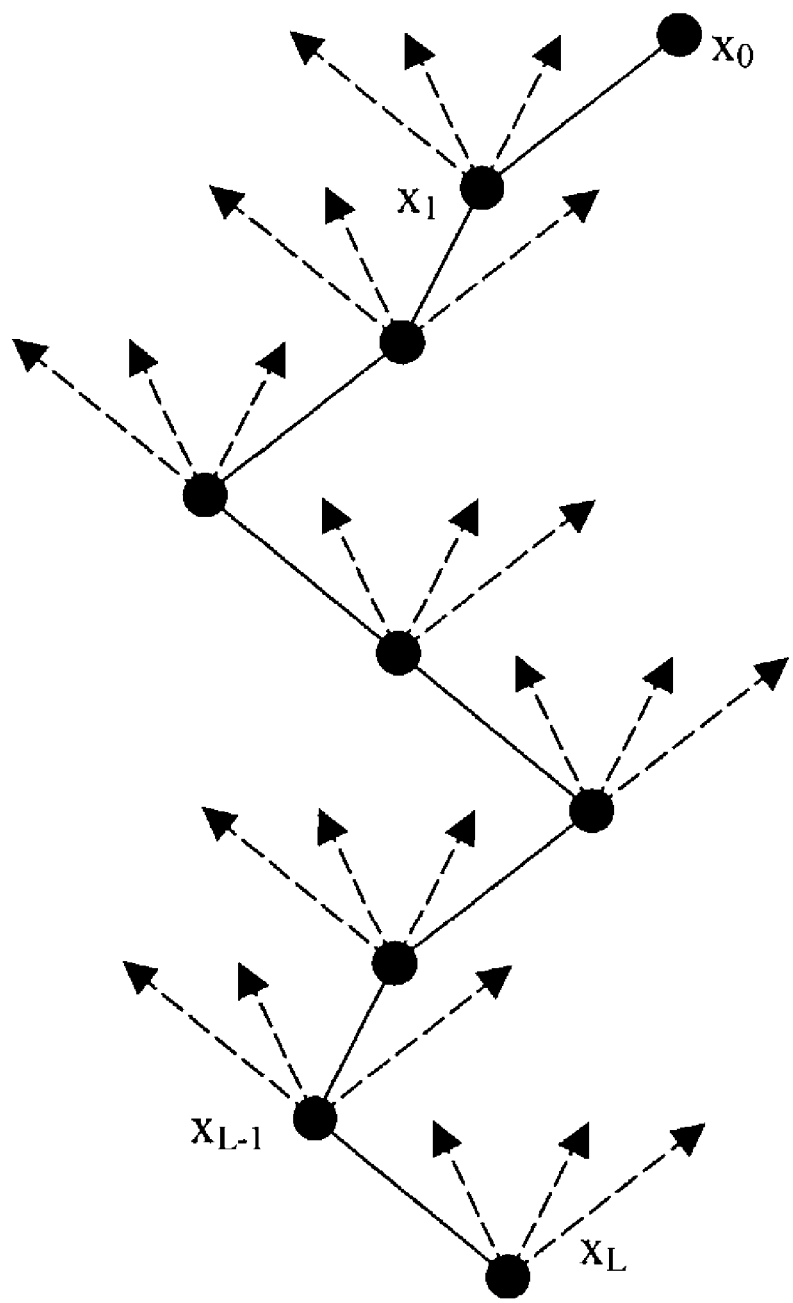
FIG. 2C depicts a fragment of a tree structure of the kind a sender S might be required to search in accordance with the present invention.

FIG. 2C shows a fragment of a tree that S might have to search. Each node in the tree is an n-bit value. Each arc is a step in the recurrence $x_{i+1}=F(x_i)$ xor i when traversing downwards, and the inverse of this step ($x_{i-1}=F^{-1}(x_i$ xor (i-1))) when traversing upwards. In the case where R has set the problem in advance, R picks some $x_0$ and proceeds downwards to reach the unique $x_L$ obtained by applying the recurrence L times. The sender S starts at $x_L$, and searches all possible upwards paths of length L, trying to find a path that has a certain property (a particular path checksum, for example). R then checks that S arrived at the same $x_0$. In the case where the problem is defined by, say, a message to be sent, S finds some $x'_0$ by search from $x_L$ found from $x_0$, and then R checks that the $x'^0$ does indeed lead to the right $x_L$ after L forward steps, and that the path has the required property.

We will now provide a more detailed discussion of memory bound computations and related inverting functions. We will also describe a complete method and variants thereof.

B.2 Memory-bound Computations: Initial Ideas

Our presently preferred approach is to force the sender S to access an unpredictable sequence of locations in a large array. The size of this array is chosen to be significantly larger than the largest cache available; at present, the size of the array could be 16 MB, say. One possibility is to prescribe a computation on some large data structure, for example, a large graph, that would force the desired memory accesses. Unfortunately, with this strategy, the definition of the function may itself become rather large and hard to communicate, and checking S's answer may be costly. Nevertheless, this strategy might be viable.

An alternative, which we adopt, is to prescribe a computation that could be done with very little memory but which is immensely helped by memory accesses. More specifically, let F( ) be a function whose domain and range are integers in the range 0 . . . ($2^n-1$), where $2^n$ is the number of entries in the array. Suppose that F( )'s inverse $F^{-1}$( ) cannot be evaluated in less time than a memory access. If we ask S to compute $F^{-1}$( ) many times, then it becomes worthwhile for S to build a table for $F^{-1}$( ), once and for all, and to rely on the table thereafter.

The table can be computed by $2^n$ applications of F( ). Building the table also requires memory accesses, for storing the table entries. However, these memory accesses can benefit from batching, and their total cost is not necessarily uniform across machines. Therefore, the cost of building the table will not necessarily be uniform across machines, so it should not be S's dominant cost in responding to R's challenge. The dominant cost should be that of performing many table lookups.

In order to develop these initial ideas, we first describe a naive embodiment and list some of its problems. Then we make an interesting but imperfect improvement. We then describe the design of a complete method.

B.2.1 A Naive Embodiment

A naive embodiment of our approach involves letting R challenge S with k values $x_0, \ldots, x_{k-1}$, and requiring S to respond with their pre-images, that is, with values $y_0, \ldots, y_{k-1}$ such that $F(y_0)=x_0, \ldots, F(y_{k-1})=x_{k-1}$.

This naive scheme is flawed, in at least four respects:

1. The size of the challenge is n×k. While n will not be very large, because $2^n$ will be smaller than the memory size, k will need to be quite large so as to determine a sufficiently difficult problem. The resulting size of the challenge could be in the order of megabytes. Therefore, the challenge would be hard to transmit to S.

2. If the values $x_0, \ldots, x_{k-1}$ are all presented at once, a brute-force search can attempt to find pre-images for all of them at once, by computing F( ) forward.

This search will require at most $2^n$ computations of F( )—a large number, but probably not large enough. If k is small enough, $x_0, \ldots, x_{k-1}$ will be cached rather than stored in memory, so this brute-force search will be CPU-bound and it will be faster than the expected memory-bound computation. If k is large, so $x_0, \ldots, x_{k-1}$ are stored in memory, the brute-force search will require memory accesses, but these can be organized in such a way that their cost is not uniform across machines. On the other hand, if R presents $x_0, \ldots, x_{k-1}$ sequentially, waiting for S's response to $x_i$ before giving $x_{i+1}$, the naive approach requires a prohibitively large number (k) of rounds of communication.

3. If R must present the challenge to S, then S is unable to prepare a message to be sent to R without first contacting R. While this interaction may be acceptable in some circumstances, we would like to have the option of avoiding it. One technique for avoiding it involves letting a trusted third party present the challenge to S; but, in some settings, a suitable trusted third party may not be easy to find.

4. The ratio of the work done at S and R is the ratio in time between a memory access and a computation of F( ). This ratio is unlikely to be more than 10, and cannot be more than a hundred or so with present machines. (Here we ignore the cost of building a table at R, since it should be dominated by the cost of the later lookups in the table, as indicated above.)

B.2.2 An Improvement: Chains

Chaining the applications of F( ) helps in addressing shortcomings 1 and 2 of the naive scheme. (We return to shortcomings 3 and 4 below.) The chaining may go as follows:

R picks a value $x_0$.

R computes $x_k$ by letting $$x_{i+1}=F(x_i)$$

for all $i \in 0 \ldots (k-1)$.

R gives $x_k$ to S and challenges it to find $x_0$.

The hope is that, as long as $2^n$ and k are large enough, the fastest approach for S would be to perform k accesses into a table to evaluate $F^{-1}( )$ as many times. S should perform these accesses in sequence, not because of interaction with R but because each access depends on the previous one. The function F( ) should be such that the sequence of accesses has poor locality and is hard to predict, so S should not benefit from caches. Finally, the size of the challenge $x_k$ (n bits) is smaller than in the naive scheme. This straightforward use of chains is however unsatisfactory. In particular, S may find $x_0$ from $x_k$ with at most $k+2^n+1$ forward computations of F( ) and hardly using memory, thus:

x:=an arbitrary value;
y:=$F^k$(z);
while y≠$x_k$ do (x,y):=(F(x),F(y));
return x This procedure may not succeed if the chain of values produced by successive invocations of F( ) contains cycles smaller than $2^n$. On the other hand, small cycles can be used as shortcuts.

In order to defeat this CPU-based solution and to eliminate cycles, we change the recurrence to be:

$$x_{i+1}=F(x_i) \text{ xor } i$$

Even after this correction, the design of a scheme based on chains requires further elaboration. In particular, when the function F( ) is not a permutation, there may be many potential pre-images of the challenge $x_k$, and we should specify which are acceptable responses to the challenge.

This difficulty can be addressed by generalizing from chains to trees, as we do next. The generalization also allows us to avoid the other shortcomings of the naive scheme discussed above.

B.3 A Complete Method: Trees

Building on the ideas of the previous section, we design and study a method that relies on trees.

B.3.1 The Method

In trying to address the shortcomings of chains, we work with functions that are not permutations, so we need to specify which pre-images of a challenge $x_k$ are acceptable responses. At least two approaches are viable:

One approach is to accept pre-images of $x_k$ other than $x_0$. It is still useful to construct $x_k$ from $x_0$, rather than completely at random, in order to ensure that at least one acceptable response exists. This approach obviously adds to the cost of verifying a response.

Another approach, which we prefer, is to accept only $x_0$, forcing S to explore a tree rather than a chain. Using a non-permutation causes S to find branches in the reverse chain, and therefore to explore a tree of depth k whose leaves are the pre-images of $x_k$; one of these leaves is $x_0$. This presents a further problem, namely that S does not know which of the many possible pre-images corresponds to $x_0$. S could perhaps send all of the pre-images to R, but this would add considerable communication cost. (The number of pre-images can be fairly large.) A solution is for R to provide S with a checksum of the path from $x_0$ to $x_k$. This checksum should be such that S can readily tell when it has found $x_0$, yet the checksum should not allow S to prune the space of pre-images in advance of a search. To make the computation of the checksum fast, only a subset of the values on the path need be checksummed—for example, every 16th value.

In summary, the resulting method is as follows:

Let k and n be two integers, and let F( ) be a function whose domain and range are integers in the range $0 \ldots (2^n-1)$. We suppose that F( )'s inverse $F^{-1}( )$ cannot be evaluated in less time than a memory access. We assume that k, n, and F( ) are known to both R and S, possibly because R has chosen them and communicated them to S.

R picks an integer $x_0$ in $0 \ldots (2^n-1)$. For $i \in 0 \ldots (k-1)$, R computes:

$$x_{i+1}=F(x_i) \text{ xor } i$$

and a checksum of the sequence $x_0, \ldots, x_k$. R sends $x_k$ and this checksum to S.

With this information, S should find $x_0$ and return it to R. When R receives a response from S, it simply checks that it is $x_0$.

We expect S to proceed as follows in order to find $x_0$:

Construct a table for $F^{-1}( )$ by applying F( ) to all integers in $0 \ldots (2^n-1)$, Build sequences $y_k, \ldots, y_0$ starting with $y_k=x_k$ and such that $$y_l \in F^{-1}(y_{l+1} \text{ xor } i)$$

(so that $y_{l+1}=F(y_l) \text{ xor } i$).

Given such a sequence, return $y_0$ if the checksum matches.

S may build the sequences $y_k, \ldots, y_0$ depth-first (hoping to find a match early, much before building all sequences); or S may build them breadth-first (trying to hide some of the memory latency). In either case, S should perform many accesses to the table for $F^{31\ -1}(\ )$. Of course, S may instead adopt alternative, CPU-intensive algorithms. However, when $F(\ )$, n, and k are chosen appropriately, we believe that S's task is memory-bound. In other words, those CPU-intensive algorithms will be slower than a memory-bound solution.

B.3.2 Trees and Work

The ratio of the work done at S and R is greatly improved when we force S to explore a tree as explained above. Thus, the use of trees also addresses problem 4 discussed above (i.e., the ratio of work done at S and R is the ratio in time between a memory access and a computation of $F(\ )$). In this section we analyze that work ratio. We also calculate the expected performance of S using alternative, CPU-intensive algorithms. We obtain some constraints on n, k, and other parameters.

A Quadratic Factor

In order to characterize that work ratio, it is helpful to be more specific on the basic function $F(\ )$. An interesting possibility, which we discuss further below, is to let $F(\ )$ be a random function. (Here, we say that $F(\ )$ is a random function if and only if $F(x)$ is uniformly distributed over $0 \ldots (2^n-1)$, for each x, and independent of all $F(y)$ for $y \neq x$.)

When $F(\ )$ is random and $k<2^n$, the size of the tree explored by S is quadratic in k, so S is forced to perform far more work than R even if it takes as long to compute $F(\ )$ as $F^{-1}(\ )$. Basically, the size of the tree is approximately $k^2/2$, and S needs to explore half of the tree on average (with depth-first search), so S needs to evaluate $F^{-1}(\ )$ roughly $k^2/4$ times on average. In contrast, R applies $F(\ )$ only k times.

More precisely, we have made the following observation. Suppose that the function $F(\ )$ on $0 \ldots (2^n-1)$ is random and $k<2^n$. Let $x_0$ be a random value and let $x_k$ be defined by the recurrence:

$$x_{l+1} = F(x_l)\ xor\ l$$

Construct a tree with root $x_k$ and in which, if y is at depth $j<k$ from the root, then z is a child of y if and only if $$y = F(z)\ xor\ (k-j-1)$$

The expected number of leaves of this tree at depth k is approximately k+1. The expected size of this tree is approximately $(k+1)(k+2)/2$.

Note that this quadratic factor requires that the tree in question be constructed from some $x_0$, rather than grown from a random $x_k$. The expected size of a tree grown from a random $x_k$ is considerably smaller.

We have only noticed this property in experiments and sketched a proof. A more sophisticated analysis might be possible using tools from research on random functions, a rich field with many techniques and theorems (see for instance Philppe Flajolet and Andrew Odlyzko. Random mapping statistics. In J-J. Quisquater and J. Vandewalle, editors, Advances in Cryptology—EURO-CRYPT '89, volume 434 of Lecture Notes in Computer Science, pages 329–354. Springer, 1990).

The experiments that form the basis for our observation also indicate that certain functions $F(\ )$ that we use, although they are not exactly random, also lead to trees of quadratic size.

In light of this quadratic factor, it is tempting to let the tree depth be very large, so as to increase the work ratio. There are however important limitations on this depth. At each level in the tree, S may try to invert all the leaves simultaneously, somehow. When there are enough leaves, S may benefit from cache behavior. Specifically, when several leaves land in the same cache line, the cost of inverting all of them is essentially the cost of just one memory access. These issues are particularly clear when k nears the size of the space, $2^n$. We must therefore keep k much smaller than $2^n$ (say, below $2^{n-5}$).

Some Calculations

Next we give a few simple formulas that (roughly) characterize the work at R and, using several different algorithms, at S. We derive some constraints on n, k, and other parameters.

For simplicity, we assume that R has chosen $F(\ )$ and communicated it to S. We also rely on the quadratic ratio established above. We assume that k is "small enough" (in particular, so that this ratio applies). Finally, we assume that checksumming is essentially free (partly because we do not require a strong cryptographic checksum). We write $f$ for the cost of one application of $F(\ )$, R for the cost of one memory read (with a cache miss), and w for the cost of one memory write.

R's cost in making a challenge will essentially be that of k applications of $F(\ )$, that is, $k \times f$ S's cost for building a table for $F^{-1}(\ )$ will be that of:
$2^n$ applications of $F(\ )$;
$2^n$ insertions into the table.

Naively, this cost appears to be $2^n \times (f+w)$. However, for some functions $F(\ )$, the cost of $2^n$ applications of $F(\ )$ may be substantially smaller than $2^n \times f$. Similarly, the cost of inserting $2^n$ entries may be substantially smaller than $2^n \times w$, because the writes can be batched and completed asynchronously by the hardware. On the other hand, if the table structure is similar to that of a hash table, then the insertions will require reads in order to resolve collisions. These reads may make the cost of building the table closer to $2^n \times (f+w)$. In the calculations below, we assume that the cost is $2^n \times (f+w)$ and we often assume that w=r.

S's cost for solving a challenge using a table for $F^{31\ -1}(\ )$ and depth-first search will be approximately that of $k^2/4$ memory accesses without significant help from caches, that is, $(k^2/4) \times r$.

If S prefers not to use a table for $F^{-1}(\ )$, it may still follow the same search strategy by pretending that it has a table and by inverting $F(\ )$ on the fly (by brute force) whenever necessary. Provided that an inversion of $F(\ )$ requires $2^n$ applications of $F(\ )$, the cost of this CPU-intensive approach will be $k^2 \times 2^n \times f$. With a little more trouble, a CPU-intensive search may be done only once for each level in the tree of pre-images, with total cost $k \times 2^n \times f$.

If S prefers not to use a table $F^{-1}(\ )$, S may also guess $x_0$ and check its guess by applying $F(\ )$. For each guess, it has to apply $F(\ )$ k times, so the expected cost of this CPU-intensive approach will be that of $2^{n-1} \times k$ applications of $F(\ )$, that is, $k \times 2^{n-1} \times f$.

Along similar lines, S may apply $F(\ )$ only $k^{1/2}$ times to each of the values in $0 \ldots (2^n-1)$; because of collisions, roughly $2^{n+1}/k^{1/2}$ distinct values will remain after this, and S may then apply $F(\ )$ to them $(k-k^{1/2})$ times (terminating half way through these applications, on average). The expected cost of this more sophisticated (but realistic) CPU-intensive approach will be $(k^{1/2} \times 2^n + 2^{n+1}/k^{1/2} \times (k-k^{1/2})/2) \times f$, that is, $(2 \times k^{1/2}-1) \times 2^n \times f$.

S may be able to find other optimizations of the brute-force, CPU-intensive search for $x_0$. In particular, in order to minimize applications of F( ), S may try to notice collisions after each round of applications of F( ) (rather than only once after $k^{1/2}$ rounds). Thus, S would apply F( ) to each of the $2^n$ values just once, then apply F( ) only once to each of their images, and so on. S may thus require $2^n \times c(k)$ applications of F( ), where c is an affine function of the logarithm of k.

We arrive at the following constraints:

1. As indicated above, the cost of building the table should not be dominant in the table-based solution. Suppose that S amortizes a table over p problems. Then we should have $$p \times (k^2/4) \times r \geq 2^n \times (f+w)$$

that is, $$k \geq 2^{(n/2)+1} \times (1/p)^{1/2} \times ((f+w)/r)^{1/2}$$

This lower bound can be reduced when, as suggested above, the cost of $2^n$ applications of F( ) and $2^n$ stores is smaller than $2^n \times (f+w)$.

2. We would like the table-based solution to be faster than the CPU-intensive solutions. With the simpler CPU-intensive solutions, this condition means roughly that $$k \leq 2^{n+1} \times (f/r)$$

With the more sophisticated CPU-intensive solution described above, however, we should have that $$k \leq (2^{n+3} \times (f/r))^{2/3}$$

Finally, fearing that one could eventually implement a CPU-intensive solution with cost $c \times 2^n \times f$, we would want $$k \leq 2^{(n/2)+1} \times p(f/r)^{1/2} \times c^{1/2}$$

(Here we simply ignore the cost of building a table for $F^{31\ 1}(\ )$, since it will be dominated by other costs.)

3. We would also like that setting a challenge is much cheaper than solving it. In other words, $(k^2/4) \times r$ should be much larger than $k \times f$, so k should be much larger than $4 \times (f/r)$. This constraint is easily satisfied when k is large.

4. Another constraint follows from our assumption that $F^{-1}(\ )$ cannot be evaluated in less time than a memory access. Obviously, $F^{-1}(\ )$ can be evaluated with $2^n$ applications of F( ), so we must have that $f \geq r/2^n$, but $r/2^n$ will be tiny. A more sophisticated construction permits evaluating $F^{-1}(\ )$ with a much smaller number of applications of F( ), as follows (see, Martin E. Hellman. A cryptanalytic time-memory trade off. IEEE Trans-actions on Information Theory, IT-26(4): 401–406, 1980; and Amos Fiat and Moni Naor. Rigorous time/space trade-offs for inverting functions. SIAM Journal on Computing, 29(3):790–803, June 2000). For j=1 . . . l, S would precompute m pairs (x, $h_j(x)$) where $h_j(x)=g_j(F(x))$ and each $g_j(\ )$ is an auxiliary function. The integers m and l should be such that $l^2 \times m$ is around $2^n$ and such that $l \times m$ pairs (x, $h_j(x)$) can be cached. Therefore, l will be at least 2; we can force it to be larger (at least 3, perhaps 6) by increasing the size ratio between the smallest memory and the largest cache under consideration. In order to find one pre-image of y, S would apply each function $h_j(\ )$ to y up to l times, hoping to hit some precomputed $h_j(x)$, then S would find a pre-image of y by working forward from the associated x. This process can be repeated to find all pre-images of y, with some probability. Making the pessimistic assumption that the applications of the functions $g_j(\ )$ are free and that there is no other overhead, S may evaluate $F^{31\ 1}(\ )$ in time $l^2 \times f$. If S has a huge cache, then l can be 2, so S may evaluate $F^{-1}(\ )$ in time $4 \times f$. On the other hand, naively, S may keep half of a table for $F^{-1}(\ )$ in a cache of the same size, and thus S may evaluate $F^{-1}(\ )$ in time r/2 on average. Under these assumptions, we should require that $4 \times f \geq r/2$, that is, $f \geq r/8$. Although these assumptions may appear fairly extreme, we believe that it is safer to keep $f \geq r/8$. In the future, we may have to raise this bound in light of new insights and results. Fortunately, this bound is not particularly problematic.

5. On the other hand, $f$ cannot be very large (or else some of the CPU-intensive solutions can be sped up). If applying F( ) naively is slower than a memory read, then S may build a table for F( ). Many of the accesses to the table might be organized in big linear scans and might therefore be relatively cheap. Moreover, part of the table might be cached, even across problems that use the same or related F( )'s, thus further reducing the effective cost of calculating F( ). Therefore, we consider $f \leq r$.

In the lower bound on k (constraint 1), the value of f should correspond to a slow machine; in the upper bound (constraint 2) and in the other constraints, to a fast machine. (We assume, pessimistically, that attackers have fast machines; we can also assume that the challenges are set at fast servers.) In order to avoid ambiguities, let us call the values of $f$ on slow and fast machines $f_0$ and $f_1$, respectively.

There exists a satisfactory value of k provided:

$$p \geq (f_0+w)/(f_1 \times c)$$

For example, when c=4, w=$f_1$, and $f_0=100 \times f_1$, we require roughly $p \geq 25$. With these values, r=w, and n=22, we may let k be $2^{13}$. The corresponding cost is that of $2^{24}$ memory accesses for each of p problems.

B.4 Refinements

Several refinements of our tree-based method are attractive—and in some circumstances, perhaps essential.

Forgetting the Challenge

Relying on a standard technique, we can save R from remembering $x_0$ after it sends it to S. Specifically, R can produce a keyed hash H(k, $x_0$) of $x_0$, using a cryptographically strong keyed hash function H and a key k known only to R, and give H(k, $x_0$) to S along with the challenge. S should return both $x_0$ and H(k, $x_0$), so R can check that S's response is correct by recomputing H(k, $x_0$) from k and $x_0$.

Varying the Function F( )

We expect that the function F( ) will vary from time to time, and even from challenge to challenge. It may be freshly generated for each challenge, at random from some family.

The variation may simply consist in xoring (exclusive or-ing) a different quantity for each challenge. Thus, given a master function MF( ) and an integer j ∈ 0 . . . ($2^n$−1), R may define a new function F( ) simply by:

$$F(x)=MF(x) \text{ xor } j$$

The integer j may be a challenge index (a counter) or may be generated at random. In either case, if R and S know the master function MF( ) in advance, then R needs to transmit only j to S in order to convey F( ). Moreover, as long as MF( ) remains fixed, S may use a table for $MF^{-1}()$ instead of a table for each derived function $F^{-1}()$, thus amortizing the cost of building the table for $MF^{-1}()$. The master function itself should change from time to time. We may not trust any one function for long. Of course, there are many other ways of defining suitable families of functions.

Using Several Problems as a Challenge

The challenge may consist of several problems of the sort described above. Thus, S would have more work to do, without increasing the complexity of each of the problems. The use of several problems may also give us some protection against variability in problem hardness. In this case, we may be concerned that S could amortize some work across the problems and solve them all in parallel with a CPU-intensive approach. Indeed, some flawed variants of our method allow such dangerous amortizations. Two twists thwart such amortization:

As described above, the function $F()$ may vary from problem to problem. All the problems in a group may share a master function.

Each problem's challenge and function (except the first) may be presented encrypted under a key derived from the path to the solution to the immediately preceding problem.

Dropping Bits from Challenges

We can always make problems harder by omitting some bits from challenges. That is, R could present only some bits of $x_k$ and a checksum of the path from $x_0$ to $x_k$; then S needs to guess or reconstruct the missing bits. This variant should be used with caution, as it slows down S's memory-bound search but it does not slow down some CPU-intensive alternatives.

Mixing Functions

Another way to make problems harder is to interleave applications of multiple functions $F_0(), \ldots, F_m()$. When R constructs the challenge $x_k$ from $x_0$, at each step, it may apply any of those functions. Thus, for all $i \in 0 \ldots (k-1)$, we have $x_{i+1}=F_j(x_i)$ xor $i$ for some $j \in 0 \ldots m$. S knows $F(), \ldots, F_m()$, but not in which sequence R applies them, or not entirely. For instance, S may know that R always applies $F_0()$ except that every 10 steps R applies either $F_0()$ or $F_1()$. Therefore, S basically has to guess (part of) the sequence of function choices when it tries to find $x_0$.

This technique seems viable. It helps in thwarting certain CPU-intensive attacks and it may yield an improvement in work ratios, at the cost of some complexity.

B.5 Variants

The tree-based method can also be adapted to scenarios in which interaction between S and R is somehow constrained. Next we describe two variants of the tree-based method that address such constraints.

B.5.1 A Non-interactive Variant

We now return to problem 3 of section B.2.1, that is, we show how to avoid requiring R to interact with S before S can send its message M.

If R (or a trusted third party) cannot present a challenge to S, then the challenge can be defined by the message M, as follows.

S is required to apply a checksum to M (or certain parts of M).

Using the result as the seed to a cryptographic random number generator, S then generates a function $F()$ and a start position $x_0$ for its tree search. (If R or a trusted third party can provide a small, partial challenge to S, then S should use it in the choice of $F()$ and $x_0$.)

S computes $x_k$ by evaluating $F()$ k times, with the recurrence;

$$x_{i+1}=F(x_i) \text{ xor } i$$

This definition guarantees that the chosen $x_k$ has at least one pre-image at depth k.

S must supply a value $x'_0$ other than $x_0$ such that $x'_0$ is a valid pre-image of $x_k$, and that some other property holds. An example of such a property might be that the checksum of the path (or subsequence of the path) from $x'_0$ to $x_k$ be 0 mod $2^m$ for some m. When $2^m$ is smaller than k, it is likely that such an $x'_0$ exists. When no such $x'_0$ exists, S can pick a new $x_0$ and $F()$ and try again. If R verifies that the $x'_0$ presented by S has the property, and that S did not discard too many functions, then R can be reasonably certain that S had to search a substantial fraction of the tree rooted at $x_k$.

We may choose a property that is quite hard to satisfy, so as to increase the work that S has to do in finding a suitable $x'_0$. Despite S's additional effort, its response can remain small.

Alternatively, should S need to do more work than that represented by solving a single problem, S may solve several problems. The problems may all be independently derived from M (each with its own function $F()$ and its own $x_0$ and $x'_0$), or they can be linked together (so the answer $x'_0$ for one problem may be used in computing the function $F()$ and the start position $x_0$ for the next problem). In either case, S should supply all the values $x'_0$.

B.5.2 Strengthening Passwords

Interestingly, some of the same ideas can be used for strengthening passwords. In this application, S and R interact before S does its work, but S need not respond to R In outline, a method for strengthening passwords goes as follows (see, Udi Manber. A simple scheme to make passwords based on one-way functions much harder to crack. Computers & Security, 15(2):171–176, 1996; Martin Abadi, T. Mark A. Lomas, and Roger Needham. Strengthening passwords. SRC Technical Note 1997-033, Digital Equipment Corporation, Systems Research Center, September/December 1997): Suppose that two parties, S and R, initially share a password p (possibly a weak password). In order to supplement p, R picks a password extension Q, and R poses a problem with solution Q. The problem should be such that S can solve it, with moderate effort, by using p, but such that Q is hard to find without p. Afterwards, S and R share not only p but also Q. In particular, S may use p and Q without further interaction with R, for instance in order to decrypt files that R has previously encrypted. For password extensions longer than n bits, each n-bit fragment may be communicated separately, with p as base password, or sequentially, with p and previous fragments as base password; the latter choice limits parallel attacks, so it seems preferable.

Previous instances of this method require a CPU-intensive computation from S. Unfortunately, this computation may need to be long in order for p and Q to be secure against attackers with faster CPUs. Next we describe an alternative instance of the method in which S performs a memory-bound computation instead.

R derives a function $F()$ from the password p (and possibly a salt and some other, public data), chooses the password extension Q, and lets $x_0$ be Q.

R computes $x_k$ by evaluating $F()$ k times, again with the recurrence:

$$x_{i+1}=F(x_i) \text{ xor } i$$

R also finds some $x'_0$ other than $x_0$ that also maps to $x_k$ in this way.

R then gives to S a checksum of the path from $x_0$ to $x_k$ (but neither $x_0$ nor $x_k$), and $x'_0$.

Using p, S derives F( ), builds a table for $F^{31\ -1}$( ), computes $x_k$, then uses $x_k$ and the table to find $x_0$, that is, Q.

An attacker that tries to find Q by guessing possible values of p will have to do a memory-bound computation for each such value. Had F( ) been independent of p, this property would of course not hold. Had R transmitted $x_k$ rather than $x'_0$, this property would probably not hold either: an attacker with a wrong guess of p would use a wrong F( ) in constructing a tree of pre-images for $x_k$, and would probably get stuck rather quickly. That is why R should provide $x'_0$. Although finding $x'_0$ is a non-trivial burden, R need not explore the full tree of pre-images of $x_k$ for this purpose. R may explore only a fraction of the tree before finding a suitable $x_0$. Alternatively, R may be able to guess $x'_0$ and verify that it maps to $x_k$; if the tree that contains $x_0$ has 1 leaves at depth k, then R will succeed after approximately $2^n/l$ guesses.

An attacker that guesses p incorrectly may detect that this guess is incorrect, with some probability, when it fails to find a path with the expected checksum. This possibility may be undesirable, although the attacker may have other, cheaper ways of detecting that its guess is incorrect. So it is attractive to use only weak checksums, so that paths with the expected checksums will always be found, or to drop checksums entirely as in the following alternative protocol:

S and R derive a function F( ) from the password p (and possibly a salt and some other, public data), and both build a table for $F^{-1}$( ).

S and R choose random values $x_S$ and $x_R$, respectively, exchange them, and let $x_0=(x_S$ xor $x_R)$.

S and R compute $x_k$ by evaluating F( ) k times, again with the recurrence $x_{i+1}=F(x_i)$ xor $i$.

They then find all $x_0'$ that map to $x_k$ in this way. The password extension Q is a function of all these $x_0'$ (for example, a hash of all of them except $x_0$). Here, both S and R perform the same (expensive) steps to compute a password extension. Undoubtedly, other protocols of this form are viable. As usual, the cost of building tables can be amortized over multiple searches. The multiple searches might be unrelated to one another; or they might all be part of the same search for an n-bit password extension (for instance, if some bits are omitted from problems); or each search might serve to find an n-bit fragment of a longer password extension.

B.6 Instantiating the Method

In this section, we describe a concrete instantiation of an illustrative implementation of our method. We discuss the choice of a basic function F( ), as well as settings for other parameters, and their motivations and effects.

B.6.1 Choosing the Function F( )

We would like a function F( ) that can be evaluated efficiently, but which nevertheless cannot be inverted in less time than a memory cache miss. These two constraints are not too hard to satisfy; next we explore some particular choices of F( ) and their features.

Random Functions

We would like F( ) to approximate a random function, in order to defeat caches and to obtain reasonable work ratios, so an appealing possibility is to let F( ) be a random function. In this case, we envision that F( ) could simply be given by a table (without much attention to the random process that generated the table).

The use of a random function F( ) gives rise to performance issues. Specifically, evaluating a random function may not always be cheap enough. In general, each computation of F( ) may require a memory access, just like each computation of $F^{31\ -1}$( ). So the ratio between the work done at S and R will be quadratic in k, but without a constant factor that represents the difference between the cost of a memory access—for computing $F^{31\ -1}$( )—and the cost of computing F( ). Although the tree search performed by S forces S to perform substantially more work than r, we may want to increase this difference by our choice of the function F( ). On the other hand, we may also increase that difference by raising k: the upper bound on k in section B.3.2 is greater when F( ) is slower.

The use of a random function F( ) also gives rise to a storage problem. In general, R will need to have a table for F( ). This requirement may sometimes be inconvenient.

Finally, the use of a random function F( ) gives rise to a communication problem. If the choice of function should change from time to time, then it is helpful for the function to have a succinct description, so that it can be communicated efficiently. True random functions do not in general have such succinct descriptions. Therefore, we may not generate and transmit a brand new, random F( ) for each challenge. Instead, we may derive a challenge-specific function F( ) from a random master function MF( ), using a definition like $F(x)=MF(x)$ xor $j$ (as discussed above). In this case, assuming that MF( ) is known in advance, only j needs to be transmitted.

Approximations

More generally, we may define:

$F(x)=G(p,x)$ where G( ) is a suitable master function (random, or random enough), and p is a parameter. For such functions, describing F( ) amounts to giving the corresponding p if G( ) is known in advance. In addition, evaluating G( ) and therefore F( ) may well be cheap. Such functions F( ) may share many of the advantages of true random functions. However, they complicate analysis.

We have investigated several candidate functions F( ) of this form. Some are based on functions G( ) from the cryptography literature: one-way hash functions such as MD5 and SHA, or variants of fast encryption algorithms such as TEA (Alfred J. Menezes, Paul C. van Oorschot, and Scott A. Vanstone. Handbook of Applied Cryptography. CRC Press, 1996). For instance, given a value x, we may apply SHA to a key p and to x, then extract F(x) from the result. Alternatively, we may apply SHA to a key p and to the n−2 high-order bits of x, then extract F(x) from the result, as well as $F(x_0)$ for all $x_0$ that differ from x only in its two low-order bits. Interestingly, this definition makes the cost of applying F( ) to all values in 0 . . . $(2^n-1)$ be ¼ of the cost of $2^n$ single applications; this cost reduction helps in building a table for $F^{-1}$( ).

Since our intended applications do not actually require much cryptographic strength, we have also investigated some faster functions F( ) of the same form. One is as follows:

Assuming that n is even, let $p_0$ and $p_1$ be two tables of $2^{n/2}$ random 32-bit numbers. Together, $p_0$ and $p_1$ play the role of p above.

Let the bitstring representing x be formed from the concatenation of $a_0$ and $a_1$ where $a_0$ and $a_1$ are bitstrings of length n/2 bits.

Then let F(x) be the middle bits of the 64-bit product of the two 32-bit numbers indexed by $a_0$ and $a_1$ in tables $p_0$ and $p_1$:

$$F(x) = \text{middle-bits } (p_0[a_0] * p_1[a_1])$$

The tables $p_0$ and $p_1$ have only $2^{n/2}$ entries, so they will fit in the cache on most machines. Thus, the evaluation of F( ) will take only a few cycles. In fact, this function is so fast that it conflicts with the condition $f \geq r/8$ of section B.3.2; it is easy to define slower variants of this function that satisfy the condition. In particular, those variants can produce outputs for several related inputs at almost the same cost as a single output.

In an early version of our work, the two tables $p_0$ and $p_1$ were identical. That saves space for R but it also enables S to use a smaller table for $F^{31\ -1}()$ because $F(a_0|a_1) = F(a_1|a_0)$. (Here, we write $a_0|a_1$ for the concatenation of $a_0$ and $a_1$.) So letting $p_0$ and $p_1$ be identical is not attractive. However, the two tables $p_0$ and $p_1$ may at least be related; for example, $p_1[a]$ could be $p_0[g(a)]$ for a suitable function g, and then $p_1$ need not be stored. In that early version of our work, we also used tables of 32-bit primes, rather than tables of arbitrary 32-bit numbers. Primes seem to yield a somewhat better F( ), but the tables are a little harder to compute. These and other variations may be worth exploring further.

Assuming that we define F( ) by letting F(x)=G(p, x) for some function G( ) (either with $F(a_0|a_1) = \text{middle-bits } (p_0[a_0] * p_1[a_1])$ or in some other way), we may still use a trivial definition $$F'(x) = F(x) \text{ xor } j$$

to generate other functions, or we may generate other functions by varying p.

B.6.2 Setting Parameters

In order to instantiate our method, we need to pick values for various parameters (n, k, $f$, p, . . . ). These choices are constrained by the available technology, and they are informed by several preferences and goals. Next we discuss some settings for these parameters and their consequences; many other similar settings are possible. All these settings are viable with current machines, and they all lead to seconds or minutes of memory-bound work for S, as intended.

Suppose that we want the table for $F^{-1}()$ to fit in 32 MB memories, but not in 8 MB caches. These constraints determine the possible values of n to be 22 or 23. One might imagine that each entry in the table will take only 3 bytes, but such a compact encoding can be quite inconvenient and impractical. It is more realistic to allocate 4 or 6 bytes per entry. With n=22, a table for $F^{-1}()$ will occupy around 16 MB (with 4 bytes per entry) or 24 MB (more comfortably, with 6 bytes per entry). With n=23, a table for $F^{-1}()$ will occupy around 32 MB (with 4 bytes per entry) or 48 MB (more comfortably, with 6 bytes per entry), so n=23 may not be viable. In what follows, we proceed with n=22 because that appears to be the appropriate value for current machines. We recommend increasing n as soon as cache sizes require it.

We have some choice in the cost $f$ of applying F( ), within the constraints of section B.3.2. A larger value will result in more work for R if it sets problems or checks solutions by applying F( ). A larger value should also result in more work for S if it adopts a CPU-intensive algorithm, so a larger value leaves room for a more expensive memory-bound solution (through a larger k). However, these effects cease when $f$ reaches the cost r of a memory read on a fast machine, because S could replace many applications of F( ) with lookups at that point. Thus S will pay at most r for applying F( ) on average, perhaps much less with caching and other optimizations. In what follows, we consider three possible values for $f$ on a fast machine: $f=r, f=r/2$, and $f=r/8$.

In light of constraints 1 and 2 of section B.3.2, we should set the number k of iterations around $2^{12}$. We have some freedom in the setting of k. Generally, a larger k will lead to more work per problem, for both parties S and R, but with a better (that is, larger) ratio between the work of S and the work of R. Conversely, a smaller k will result in less work per problem, with a smaller work ratio. Therefore, we tend to prefer larger values for k. When k is too large, CPU-intensive solutions become competitive with the table-based approach, and their cost is not uniform across machines. On the other hand, when k is too small, the cost of building a table for $F^{-1}()$ becomes dominant in the table-based approach, and this cost is not uniform across machines. In what follows, we proceed with $k=2^{13}$ if $f=r$, with $k=2^{12}$ if $f=r/2$, and with $k=2^{11}$ if $f=r/8$.

Finally, we have some choice in the number p of problems over which a table for $F^{-1}()$ should be amortized. Generally, a larger p is better, primarily because it gives us more freedom in setting other parameters. The number p could be huge if we used a fixed function (or a fixed master function) forever. However, we believe that it is prudent to use a different function for each problem, and also to change master functions at least from time to time. An obvious possibility is to group problems and to adopt a new master function for each group. We may present each problem in 6 bytes (including the required checksum), and each solution in 3 bytes. For p=128, each group of problems occupies under 1KB, giving rise to a visible but reasonable communication cost. The communication cost can be drastically reduced with the non-interactive variant, if we so wish. For the sake of definiteness, we proceed with p=32. Each group of 32 problems occupies only 192 bytes.

We expect that a machine can do roughly $2^{23}$ reads per second from memory (within a small factor). On the basis of this data, we can calculate the cost of setting and solving problems:

With $f=r$ and $k=2^{13}$, we intend that S perform $2^{24}$ reads per problem, so S should take 2 seconds per problem. The setting of a problem will require $2^{13}$ applications of F( ), which will take one millisecond on a fast machine.

With $f=r/2$ and $k=2^{12}$, we intend that S perform $2^{22}$ reads per problem, so S should take 0.5 seconds per problem. The setting of a problem will require $2^{12}$ applications of F( ), which will take 0.25 milliseconds on a fast machine.

With $f=r/8$ and $k=2^{11}$, we intend that S perform $2^{20}$ reads per problem, so S should take 0.125 seconds per problem. The setting of a problem will require $2^{11}$ applications of F( ), which will take 32 microseconds on a fast machine.

When we multiply these costs by the number of problems (32), we obtain costs for solving groups of problems (64, 16, and 4 seconds, respectively). We should check that these costs dominate the cost of building a table for $F^{31\ -1}()$. The cost of building a table is roughly that of $2^{22}$ applications of F( ) and writes. On a fast machine, the writes yield a substantial part of the cost; the cost should be under one second, in any case. On a slow machine, the applications of F( ) account for most of the cost; the cost may go up considerably, but no higher than the cost of solving a group of problems. Even if each application of F( ) were to cost as much as 100×r on a slow machine, building a table would take under one minute. Thus, the total cost for building a table and solving a group of problems remains within a small factor across machines.

We should also compare these costs to that of solving problems with a CPU-intensive algorithm. Suppose that some CPU-intensive algorithm could solve each problem with just 4×2n applications of F( ), that is, with just $2^{24}$ applications of F( ) (letting c=4, in the notation of section B.3.2). Depending on whether $f=r, f=r/2$, or $f=r/8$, those applications will cost as much as $2^{24}$, $2^{23}$, or $2^{21}$ reads, respectively. In comparison, the memory-bound approach requires $2^{24}$, $2^{22}$, and $2^{20}$ reads, respectively.

Relying on an 8 MB cache and a compact encoding, S might be able to evaluate $F^{-1}( )$ with only 4 applications of F( ) (Martin E. Hellman. A cryptanalytic time-memory trade off. FEEE Transactions on Information Theory, IT-26(4): 401–406, 1980; Amos Fiat and Moni Naor. Rigorous time/space trade-offs for inverting functions. SIAM Journal on Computing, 29(3):790–803, June 2000) (see section 3.2). Thus, S might replace each read with 4 applications of F( ) and otherwise perform the same search as in the memory-bound approach. When $f=r$ or $f=r/2$, this strategy does not beat a CPU-intensive algorithm that could solve each problem with $2^{24}$ applications of F( ), and a fortiori it does not beat the memory-bound algorithm. When $f=r/8$, this strategy may produce a solution at the same cost as $2^{19}$ reads, so it might appear to be faster than the memory-bound algorithm. However, we should note that the memory-bound algorithm will have that same cost if S has an 8 MB cache and holds there half of a table for $F^{31\ 1}( )$ with a compact encoding.

B.7 Conclusion re Memory-Bound Functions

We have identified moderately hard functions that most recent computer systems will evaluate at about the same speed. Such functions can help in protecting against a variety of abuses. The uniformity of their cost across systems means that they need not inconvenience low-end, legitimate users in order to deter high-end attackers. We define and study a family of moderately hard functions whose computation can benefit crucially from accesses to a large table in memory. Our experimental results indicate that these memory-bound functions are indeed much more egalitarian across machine types than CPU-bound functions.

C. Basic Operation of Exemplary Ticket Service

In its simplest form, the Ticket Service (implemented by one or more Ticket Servers) provides two operations to its customers: "Request Ticket" and "Cancel Ticket". The "Request Ticket" operation can be implemented with arguments; it returns a "Ticket Kit". The Ticket Kit specifies one or more "challenges". The challenges can take a variety of forms, such as computing a hard function (paying for the ticket by CPU cycles), or solving a "Turing Test" puzzle, or paying for the ticket by credit card (in some separate transaction not described here). The requestor decides which challenge to accept and does whatever it takes to respond to the challenge. The requestor can then take the response, and the rest of the Ticket Kit, and assemble them into a new, valid, ticket. (Details of how this may be achieved are described below.)

Thus, referring to FIG. 2A, client "A" 10A sends a Request Ticket message to Ticket Service 20, and receives a challenge and Ticket Kit in return. (In this description, we sometimes indicate that a challenge and Ticket Kit are provided to the client. This terminology is not intended to imply that the challenge and Ticket Kit are necessarily separate and distinct entities; indeed, the Ticket Kit may itself contain the challenge, or an identification of the challenge, as discussed below.) This request-response sequence is referred to as transaction T1. Next, client "A" transmits the ticket to client "B" (transaction T2). This may be done, e.g., in connection with sending an e-mail message to client B, or in making some other request to client "B". For example, client "B" could be a web server (albeit a client from the perspective of the Ticket Server 20) and the request from client "A" could be for some free service offered by client "B". Such a request for free service could be a query to an index server, a request for a URL, a request for stock quotes, or the like. (As mentioned, the present invention has a variety of potential applications, including account creations; addurl at index/directory services; index mining; and load control on free services.) Client "B" then sends a Cancel Ticket request to Ticket Service 20 and receives an acknowledgement that the ticket has been cancelled (transaction T3).

The requester, client "A" in the foregoing example, can use this ticket, once, in any manner he chooses (for example, he can transmit it as a header line in an e-mail message). Someone receiving a ticket (for example, the recipient of the e-mail, client B in the foregoing example) can take the ticket and call the Ticket Server's "Cancel Ticket" operation. This operation verifies that the ticket is valid, and that it has not been used before. It then marks the ticket as having been used, and returns to the caller (for example, the recipient of the e-mail) indicating that the operation succeeded. Of course, the "Cancel Ticket" operation should return a failure response if the ticket is invalid or has previously been used.

Finally, whoever receives the ticket and performs the "Cancel Ticket" operation (whether client "B" or the ISP, discussed below in connection with FIG. 2B) can choose to refund the ticket to the originator by invoking the "Reuse Ticket" operation at the Ticket Server 20. This causes the Ticket Server to credit the ticket to the original requestor's account. Requestors with a positive balance in their account can call the "Request Ticket" operation and will be given a new, valid, unused, ticket without any need to perform a challenge (and their account can be debited).

As will be seen in the detailed protocol description below, use of tickets provides some additional benefits. The ticket identifies the requester (by an account identifier created by the Ticket Server). In addition to the ticket itself, the requestor can be given a ticket-specific encryption key; this can be used to protect material that is shipped with the ticket, since the same key is returned to the caller of the "Cancel Ticket" operation.

D. Application of Ticket Service to Spam Prevention in System With ISP

One presently preferred use of the Ticket Server is in a system for reducing spam e-mail message traffic. In an illustrative embodiment, a recipient agrees with his e-mail service provider (ISP) that the recipient will be shown only messages that are from trusted senders (a "white list"), or that have passed some form of pro-active spam-filtering software, or that have an attached ticket. When a message arrives with a ticket attached, or from a sender in the recipient's white list, the ISP calls the "Cancel Ticket" operation to verify and cancel the ticket, and provided this succeeds, proceeds to deliver the message to the recipient's inbox. However, when the ISP receives an e-mail message not from a white-listed sender and without a stamp, the ISP holds the message (invisibly to the recipient) and sends a bounce e-mail to the sender. The bounce e-mail offers the sender two choices: he can provide some previously acquired ticket, or he can acquire a new ticket by interacting with the Ticket Service. This is depicted in FIG. 2B.

In the implementation of FIG. 2B, client "A" issues a request to ISP 30 for delivery of e-mail to client "B", but in this case receives a Bounce message from ISP 30 referring client "A" to the Ticket Server. This request/response sequence is denoted transaction T1 in FIG. 2B. In the next transaction, T2, client "A" requests a ticket and receives a Ticket Kit from the Ticket Server. Client "A" then submits the Ticket to ISP 30, in transaction T3, and ISP 30 cancels the ticket, in transaction T4. In transaction T5, the e-mail message from client "A" is deposited in the mailbox of client "B".

In the case where the sender chooses to use a previously acquired ticket, he simply provides it to the ISP by passing it as an argument of an HTTP request to the ISP (e.g., through an HTML form provided as part of the bounce message). On receipt of this, the ISP calls the "Cancel Ticket" operation to verify and cancel the ticket, and provided this succeeds, proceeds to deliver the message to the recipient's inbox.

Alternatively, if the sender wants to acquire a new ticket at this time, he calls the Ticket Service 20. To simplify doing so, the bounce e-mail contains a link (e.g., a URL) to the Ticket Service. Clicking on the link performs a "Request Ticket" operation at the Ticket Server. The result appears to the sender as a web page describing the available challenges. For example, for the computational challenge the web page will contain a link that would cause the sender to perform the computation (e.g., via a downloadable ActiveX control or a Java applet). As another example, the web page resulting from the "Request Ticket" operation could include a "Turing Test" problem such as those used by the Captcha system discussed in the Background section above. When the user solves the problem, he types it into a type-in form on the challenge web page. In either case, the result of the challenge is combined with the Ticket Kit data (also on the web page), and the resulting ticket is passed via HTTP to the recipient's ISP 30. The ISP now proceeds as above, verifying and canceling the ticket and delivering the message to the recipient.

In any of the above cases, if a message arrives not from a white list member and without a ticket, or if the sender's address is invalid (so that no bounce message can be sent), or if an invalid or previously cancelled ticket is provided at any stage, then the ISP 30 silently discards the message. The same is true of messages that exist for too long without a ticket being submitted to the ISP.

The recipient can now see the message in question, because it came from a white list member, or because it is associated with a valid (and now cancelled) ticket. If the recipient decides that the sender should indeed pay for the message, he need do nothing more. However, if the recipient decides that this message was not spam, the recipient can choose to call the Ticket Server's "Reuse Ticket" operation, to refund the ticket's value to the sender.

There are many failure cases for this protocol, all resulting in the affected message being silently deleted. For example, the sender might not have provided an appropriate return address for the bounce message. Alternatively, the sender might choose to ignore the bounce message and never send a ticket; after a timeout the ISP will silently discard the e-mail. There are also cases where the sender tries to cheat, by providing an invalid ticket, or one that has already been cancelled; these also result in the e-mail being silently discarded.

E. Exemplary Protocol

The following data types and messages implement the Ticket Server's three operations. "Request Ticket" is message (1) and its response is message (2); "Cancel Ticket" is message (4) and its response is (5); "Reuse Ticket is message (6),and its response (7). The participants in the protocol are the Ticket Server itself, client "A", the client that requests a ticket, and client "B", the client that receives the ticket from A and uses it in messages (4) through (7). In the case of e-mail spam prevention, client "A" is the sender (or perhaps the sender's ISP) and client "B" is the recipient's ISP (or perhaps the recipient mail user agent software).

Functions and Values

The functions and values involved are as follows. See the "Commentary" section below for discussion of how some of them (especially "P" and "F") are represented.

The components used in the protocol exchanges are listed below. The representations T and TK of Tickets and Ticket Kits are described later.

S is a unique identifier for a ticket (in practice, a sequence number issued by the Ticket Server).

$I_A$ identifies A (and $K_A$) to the Ticket Server.

$I_B$ identifies B (and $K_B$) to the Ticket Server.

$K_T$, $K_A$, $K_B$, and $K_S$ are secret keys (for ticket T, for A, for B, and for the Ticket Server).

$TransID_A$ is an identifier chosen by A to identify a "Request Ticket" transaction.

$TransID_B$ is an identifier chosen by B to identify a "Use Ticket" transaction.

H(m) is a secure hash function, such as MD5; H(k, m) is a keyed secure hash function.

K(m) uses key K to protect message m in transit. This might provide a secure MAC for m, and/or it might encrypt m using K, and/or it might prove the timeliness of m by including a secured real-time clock value.

P is a Boolean predicate that specifies a particular, ticket-specific, challenge. For example, if the challenge was an OCR-based Turing Test, then P(G) would be "G is the text contained in this (given) distorted image". See the commentary section for further examples of p, X, ƒ and C.

X is the answer to a challenge (determined by the ticket requestor, as described below). For example, the text mentioned above. X is an appropriate answer if and only if P(X) is true.

F is a function that the Ticket Server will use in verifying the challenge answer. For the OCR-based Turing Test this is degenerate: F(G)=G. But for computational challenges F will verify the result of the computation. In all useful challenges, computing F is fast.

C is a secret that assists the Ticket Server to verify the challenge answer. For the OCR-based Turing test C is the text that was actually in the distorted image I.

M is a message, or other request for a service that might require a ticket.

The Ticket Server maintains the following state, in stable storage:

Its own secret key, $K_S$.

State(S)="Issued" or "Cancelled", for each ticket that has ever been issued.

Balance($I_A$)=an integer, the account balance for A's account.

Result(TransID$_A$)=result of the most recent "Request Ticket" operation that contained transID$_A$.

Canceller(S)=TransID$_B$ for each ticket that has recently been cancelled.

Reused(S)=a Boolean indicating whether the ticket has been re-credited to A's account.

The following are trivially derived from other values:

TK=(S, P, F, I$_A$, H(K$_S$, ("Hash for TK", S, F, C, I$_A$))), a "Ticket Kit".

T=(S, X, F, I$_A$, H(K$_S$, ("Hash for T", S, F, C, I$_A$))), a ticket issued to A.

K$_T$=H(K$_S$, ("Hash for K$_T$", T.S)), the requestor's secret key for T.

K$_T$'=H(K$_S$, ("Hash for KT prime", T.S)), the canceller's secret key for T.

K$_A$=H(K$_S$, ("Hash for KA", I$_A$)), the secret key identified by I$_A$.

K$_B$=H(K$_S$, ("Hash for KB", I$_B$)), the secret key identified by I$_B$.

T.S is the S used in forming T; similarly for the other components of T, and for components of TK.

A ticket T is "valid" if and only if T.S has been issued by the Ticket Server, and H(K$_S$, (T.S, T.F, Y, T.I$_A$))=HT, where HT is the keyed hash in T and Y=T.F(T.X). Note that this definition includes valid but cancelled tickets (it makes the exposition easier).

The Ticket Server creates Ticket Kits TK such that the ticket constructed by replacing TK.P with X, for any X for which TK.P(X) is true, will be a valid ticket. In other words, the challenge is to find an X such that P(X) is true. This turns out to be a highly flexible representation, usable for a wide variety of challenges. See the commentary section for discussion and some examples.

When client A wishes to acquire a new ticket, it chooses a new TransID$_A$, and calls the Ticket Server:

(1) A→Ticket Server: I$_A$, K$_A$("Request", TransID$_A$)     (1)

The Ticket Server uses I$_A$ to compute K$_A$, and verifies the integrity and timeliness of the message (or else it discards the request with no further action). Now, there are three possibilities:

If Result(TransID$_A$) is already defined, it is left unaltered.

If Balance(I$_A$)>0, then it is decremented and Result(TransID$_A$) is set to a new valid ticket T such that State(T.S)= "Issued". Note that in this case the Ticket Server has no need to compute a response to a challenge: it is free to use a trivial value for T.F and for the C in T's keyed hash.

If Balance(I$_A$)=0, then Result(TransID$_A$) is set to a Ticket Kit TK for a new valid ticket, such that State(TK.S)= "Issued". Note that the Ticket Server does not compute the response to the challenge implicit in TK: it's up to A to do that.

The Ticket Server computes K$_T$ from TK.S or T.S, and sends it and Result(TransID$_A$) to A:

Ticket Server→A: I$_A$, K$_A$( "OK", Result(TransID$_A$), K$_T$, TransID$_A$)     (2)

A verifies the integrity of this message (or else discards it). Note that if message (2) is lost or corrupted, A can retransmit (1), causing the Ticket Server to retransmit an identical copy of (2). If the result is a Ticket Kit TK, not a complete ticket, then A can take TK, perform the challenge by determining some X such that P(X), and assemble the complete ticket T containing TK.S.

When A wants to use T to send B the message M (or other request for service), A sends:

A→B:T,K$_T$(M).     (3)

Note that B does not yet know K$_T$. B now asks the Ticket Server to change the state of T.S to "Cancelled". B chooses a new TransID$_B$, and sends:

B→Ticket Server: I$_B$, K$_B$("Cancel", T, TransID$_B$).     (4)

The Ticket Server verifies the integrity of this message (or discards it). If T is not "valid" (as defined above), or if State(T.S)="Cancelled" and Canceller(T.S) is not TransID$_B$, then the result of this call is "Error". Otherwise, the Ticket Server sets the state of T.S to "Cancelled", sets Canceller (T.S) to TransID$_B$, computes K$_T$, and sends it back to B:

Ticket Server→B: I$_B$, K$_B$(("Error"|"OK", K$_T$, K$_T$')), TransID$_B$).     (5)

B verifies the integrity of this message (or else discards it). Note that if message (5) is lost or corrupted, B can retransmit (4), causing the Ticket Server to retransmit an identical copy of (5). B can now use K$_T$ to verify the integrity of (3), and to extract M from it if it was in fact encrypted with K$_T$.

In the spam-prevention scenario, client "B" is the recipient's ISP (or mail user agent). The ISP will now proceed to make the e-mail visible to the recipient. If the recipient decides that M should be accepted without payment, then the recipient (or the recipient's ISP) tells the Ticket Server to recycle this ticket:

B→Ticket Server: T.S, K$_T$'("Reuse", T).     (6)

The Ticket Server verifies the integrity of this message (or discards it). Note that in doing so it computes K$_T$'from T.S, so the verification will succeed only if B truly knew K$_T$'. If Reused(T.S) is false, the Ticket Server sets Reused(T.S) and increments Balance(T.I$_A$). Regardless of the previous value of Reused(T.S), the Ticket Server then reports completion of the operation:

Ticket Server→B: T.S, K$_T$'("OK").     (7)

Commentary on Exemplary Protocol

The transaction ID in step (1) allows for the error case where the response (2) is lost. In this case, client "A" can retransmit the request and get the ticket that client "A" has paid for (in the case where A's account was decremented) without needing to pay again. The key K$_A$ authenticates client "A" so that nobody else can acquire tickets charged to A's account. Since I$_A$ gets embedded in T, it then authenticates the ticket as having been issued to client "A" (or more precisely, to a principal that knows I$_A$ and K$_A$). The K$_T$ returned to "A" allows "A" to construct K$_T$(M); in other words, it permits client "A" to use T for a message of A's choosing.

When client "B" receives (3), "B" does not know K$_T$ and so "B" cannot reuse T for its own purposes. Client "B" only acquires K$_T$ after canceling the ticket.

The transaction ID used in request (4) allows client "B" to retransmit this request if the response is lost. Because the Ticket Server has recorded Canceller(T.S), it can detect the retransmission and return a successfully outcome even although the ticket has in this case already been cancelled.

If the result (7) is lost, client "B" can retransmit the request. Because of the Ticket Server's "Reused" data structure, this will not cause any extra increment of client A's account balance. Note that the use of K$_T$' in request (7) authenticates the principal authorized to re-use T. In this exemplary embodiment, one can only credit A's account if T has been cancelled. Also, it is fine for client "A" to do this itself, but if it does so it cannot use T for any other purpose (T has been cancelled).

Ticket State

The Ticket Server uses sequential serial numbers when creating the unique identifier S for a new ticket. The Ticket Server maintains in stable storage an integer that indicates the largest serial number that it has used in any ticket. It is easy to implement this efficiently, if one is willing to lose a few serial numbers if/when the Ticket Server crashes. The Ticket Server maintains in volatile memory the largest serial number that has actually been used ($S_{used}$), and in stable storage a number always larger than this ($S_{bound}$). When enough serial numbers have been used that $S_{used}$ is approaching $S_{bound}$, the Ticket Server rewrites $S_{bound}$ with the new value $S_{used}+K$, where k is chosen to make the number of stable storage writes for this process insignificant (e.g., k=1,000,000). If the Ticket Server crashes, up to k serial numbers might be lost. In no case will serial numbers get reused.

The only state information maintained by the Ticket Server for each ticket (with $S<=S_{used}$) is the ticket's state ("Issued", or "Cancelled") and Reused(S). This requires 2 bits per ticket. The Ticket Server can maintain this in volatile memory with an array indexed by ticket serial number. For a large-scale Ticket Server, 1 GBytes of DRAM would be enough to keep this state for 8 billion tickets. One can choose to limit ticket lifetimes such that there are no more than 8 billion tickets in flight, or one can use a more complex data structure to slave the DRAM data from stable storage on disk.

When a ticket changes state (from "issued" to "cancelled"), the Ticket Server updates this array, and synchronously with the operation records the transition in stable storage. All it needs to record is the ticket serial number, and the new state. While this is indeed a disk operation, note that on a busy Ticket Server many operations can be handled in parallel. Many ticket state changes can be recorded in a single disk request. So while each individual operation will incur the latency of a disk request, the overall throughput of the Ticket Server gets limited only by the disk data rate (at 130 bits written to disk in the life of each ticket); so in practice the disk delays should not be significant.

F. Computer and Network Environment

It is apparent from the foregoing description that the present invention is made for implementation in a computer network such as, e.g., the Internet or other wide area or local area network (WAN or LAN). Although a TCP/IP network is exemplary, the invention is by no means restricted to this or any other networking protocol. In addition, the invention may be employed in a wired or wireless network, or a hybrid network.

Figure 3:
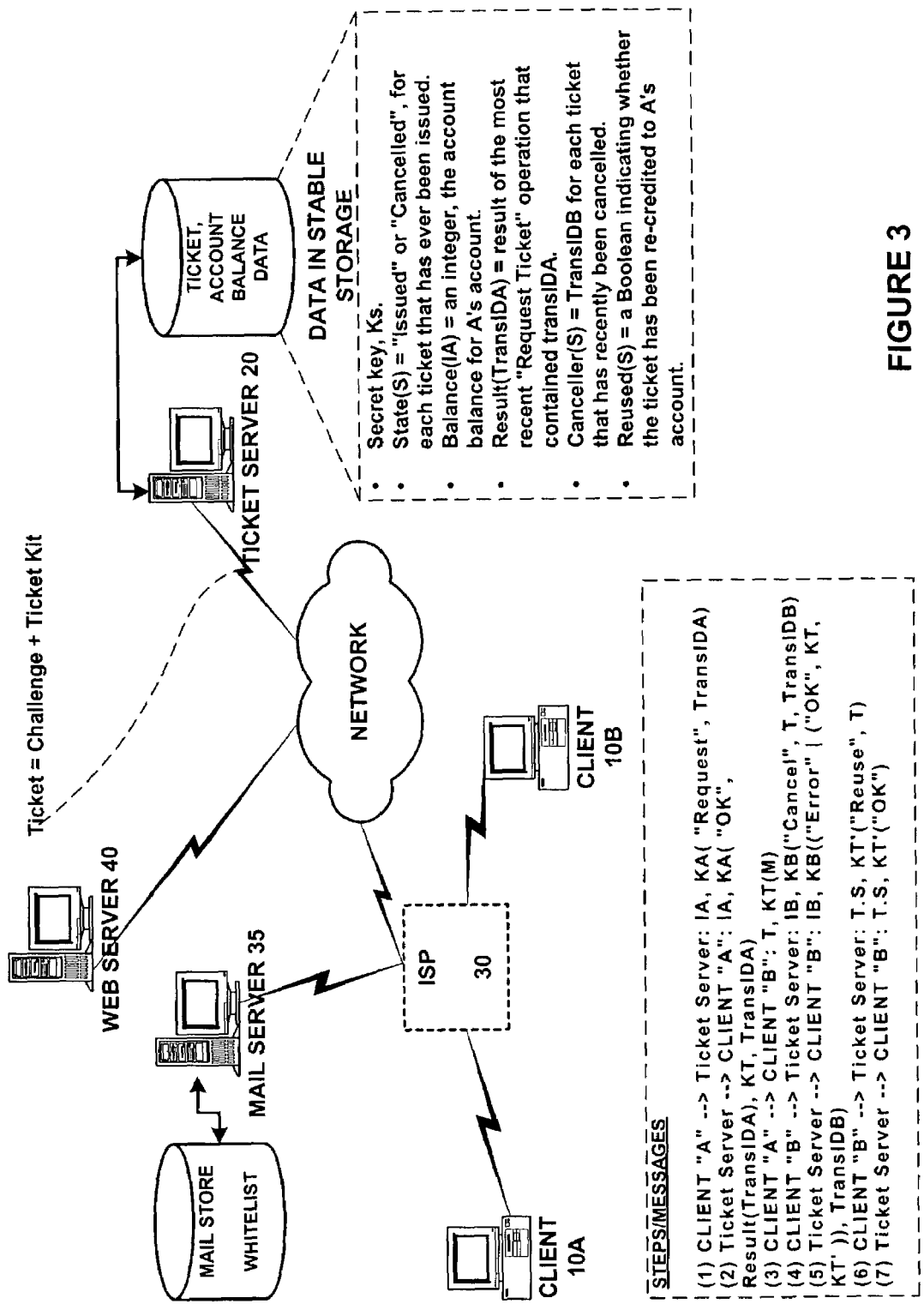
FIG. 3 schematically depicts an exemplary network environment in which the present invention may be practiced.

FIG. 3 depicts an illustrative network environment in which the present invention may be practiced. As shown, clients 10A and 10B are coupled to the network (cloud) either directly or via an optional (hence the dash-line box) ISP 30. In addition, a mail server 35 and web server 40 are shown. The Ticket Server 20 is also shown along with a database in which ticket data and account balance information is stored. As discussed above, the data maintained in stable storage includes: (1) the Ticket Server's secret key, $K_t$; (2) State(S)="Issued" or "Cancelled", for each ticket that has ever been issued; (3) Balance($I_A$)=an integer, the account balance for each client's account; (4) Result($TransID_A$)= result of the most recent "Request Ticket" operation that contained $transID_A$; (5) Canceller(S)=$TransID_B$ for each ticket that has recently been cancelled; and (6) Reused(S)=a Boolean indicating whether the ticket has been re-credited to A's account.

Figure 4:
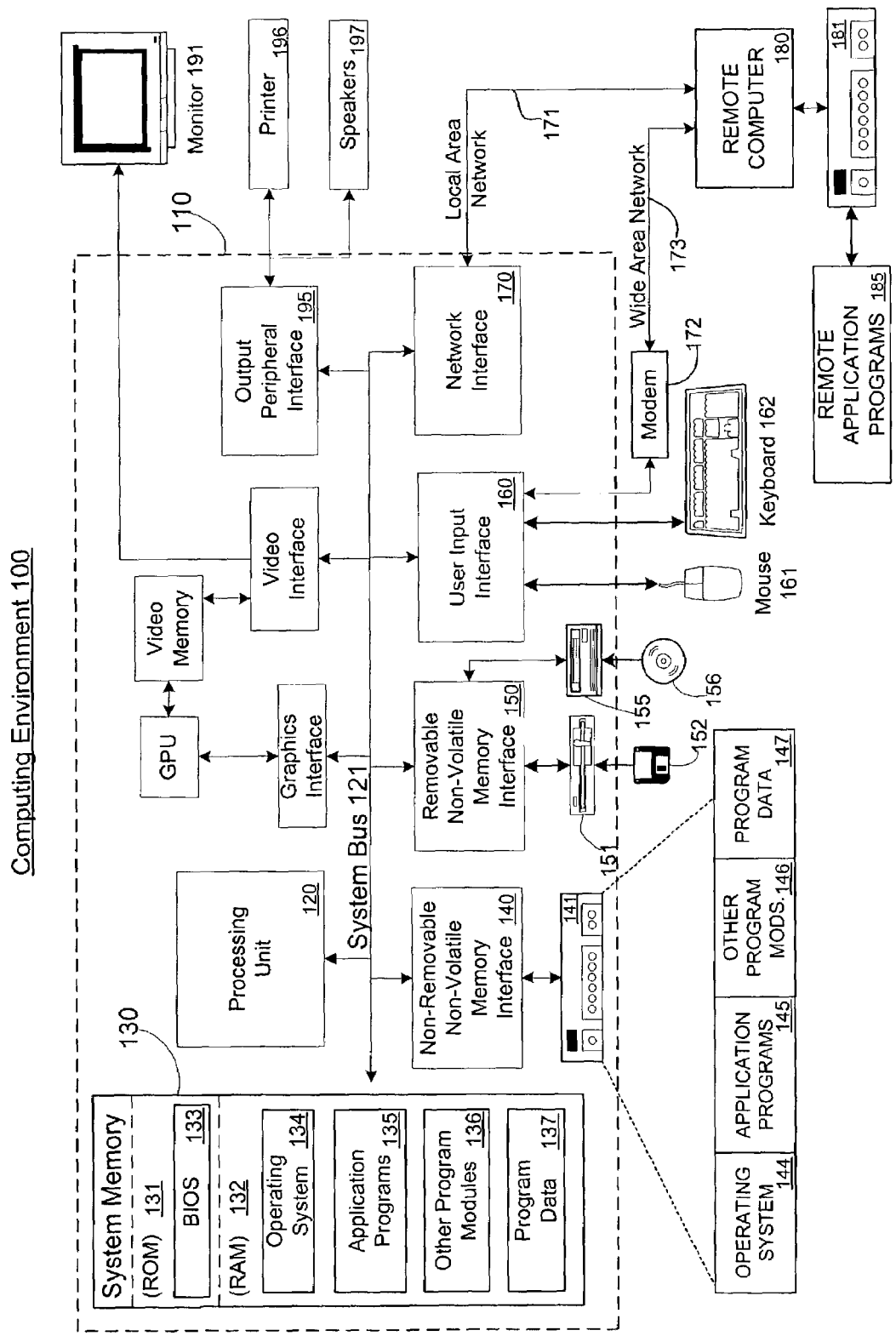
FIG. 4 schematically depicts an exemplary computing environment in which the present invention may be practiced.

FIG. 4 and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example. Those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. As discussed above, the invention may be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 4 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 4, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. Processing unit 120 may comprises one or more processors. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4 provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for AGP communications. One or more graphics processing units (GPUs) 184 may communicate with graphics interface 182. In this regard, GPUs 184 generally include on-chip memory storage, such as register storage and GPUs 184 communicate with a video memory 186. The invention may be described more generally in connection with any coprocessor, of which GPUs 184 are but one example. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

G. Conclusion

While the present invention has been described in connection with the presently preferred embodiments, it is to be understood that other embodiments may be used or modifications and additions may be made to the described embodiments for performing the same function of the present invention without deviating therefrom. Furthermore, it should be emphasized that a variety of computer platforms may be employed, especially as the number of wireless and other networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims. In sum, we have described memory bound function suitable for use in a variety of applications, including but not limited to spam prevention, account creations, addurl at index/directory services, index mining, load control, defending against connection depletion attacks, and strengthening passwords. One exemplary application of a memory bound function in accordance with the present invention is in connection with a Ticket Service comprising, inter alia, a central, network-based Ticket Server and an inventive protocol for delivering, canceling and managing tickets, as described herein. The invention, however, is by no means limited to applications involving a Ticket Server or a Ticket Service. The scope of protection of the claims set forth below is not intended to be limited to the particulars described herein in connection with the detailed description of presently preferred embodiments.

We claim:

1. A method for preventing abuse of a resource on a computer network comprising:

communicating information about a computational puzzle to at least one of a plurality of computers; and causing the at least one computer to solve the puzzle in a manner such that the at least one computer incurs a computational cost within a predetermined range;

wherein said computational puzzle has a solution that is best found by a computation whose speed is limited by memory latency; and wherein the solution causes the at least one computer to access a hard-to-predict sequence of locations in a memory array.

2. A method as recited in claim 1, wherein the memory array is significantly larger than the largest cache generally available to the plurality of computers.

3. A method as recited in claim 1, wherein the memory array to be accessed by the at least one computer has $2^n$ entries, where n is an integer, and the computational puzzle comprises a function F( ) whose domain and range are integers in the range $0 \ldots 2^n-1$, wherein F( ) is characterized in that its inverse $F^{-1}( )$ cannot be evaluated in less time than a memory access.

4. A method as recited in claim 1, wherein said method is implemented as follows:

(1) let k and n be integers and F( ) a function whose domain and range are integers in the range $0 \ldots (2^n-1)$;

(2) pick an integer $x^0$ in $0 \ldots (2^n-1)$, and for $i \in 0 \ldots (k-1)$, compute $x_{i+1}=F(x_i)$ xor i and a checksum of the sequence $x_0, \ldots, x_k$;

(3) send at least some bits of $x_k$ and the checksum to the at least one computer; and (4) require the at least one computer to use this information to find $x_0$.

5. A method as recited in claim 1, wherein the computational puzzle is based on a memory bound function that is varied from time to time.

6. A method as recited in claim 1, wherein the computational puzzle is based on a memory bound function that is varied from challenge to challenge.

7. A method as recited in claim 1, wherein the at least one computer is required to show that it has computed a plurality of memory bound functions.

8. A method for preventing abuse of a resource on a computer network, comprising:

communicating information about a computational puzzle to at least one of a plurality of computers; and causing the at least one computer to solve the puzzle in a manner such that the at least one computer incurs a computational cost within a predetermined range;

wherein said computational puzzle depends upon a password, and said solution is used as an extension to the password; and wherein the method comprises the following steps:

first and second computers share a password p;

the second computer, to supplement p, picks a password extension Q;

the second computer poses a puzzle with solution Q, wherein the puzzle is such that the first computer can solve it with moderate effort by using p but such that Q is hard to find without p; and the first computer solves the puzzle.

9. A method as recited in claim 8, wherein the method is further characterized by the following steps:

the second computer derives a function F( ) from the password p, chooses the password extension Q, and lets a first number $x_0$ be Q;

the second computer computes a second number $x_k$ by evaluating F( ) k times with the recurrence $x_{i+1}=F(x_i)$ xor i;

the second computer finds a third number $x'_0$ that also maps to $x_k$ using the recurrence;

the second computer gives to the first computer a checksum of the path from $x_0$ to $x_k$, and $x'_0$; and using p, the first computer derives F( ), builds a table for $F^{-1}( )$, computes $x_k$, then uses $x_k$ and the table to find $x_0$, which is then used as the password extension Q.

10. A method as recited in claim 8, wherein the method is further characterized by the following steps:

the first and second computers derive a function F( ) from at least the password p, and both build a table for $F^{-1}( )$;

the first and second computers choose random values ($x_S$ and $x_R$, respectively);

the first and second computers exchange the random values, and let $X_0=(x_S$ xor $x_R)$;

the first and second computers compute $x_k$ by evaluating F( ) k times, with the recurrence: $x_{i+1}=F(x_i)$ xor i.

11. A method as recited in claim 8, wherein the first computer finds Q by computing a memory bound function.

12. A method as recited in claim 11, wherein the first computer uses p and Q to access password-protected information.

13. A method as recited in claim 11, wherein the first computer uses p and Q to decrypt files that the second computer has previously encrypted.

14. A method for preventing abuse of a resource on a computer network, comprising:

receiving a request for access to said resource from a client; and requiring said client to show that it has computed a predefined memory-bound function before providing access to said resource;

wherein said memory-bound function comprises an algorithm that causes said client, in computing said function, to access locations in a region of memory in a random or pseudo-random way; and wherein the size of said region of memory to be accessed by said client is significantly larger than the size of the largest cache of any computer on which the method might be implemented.

15. A method for preventing abuse of a resource on a computer network, comprising:
- receiving a request for access to said resource from a client; and
- requiring said client to show that it has computed a predefined memory-bound function before providing access to said resource;
- wherein said memory-bound function comprises an algorithm that causes said client, in computing said function, to access locations in a region of memory in a random or pseudo-random way; and
- wherein said algorithm prescribes a computation on a large data structure, thus forcing said client to perform memory accesses across said region of memory.

16. A method for preventing abuse of a resource on a computer network, comprising:
- receiving a request for access to said resource from a client; and
- requiring said client to show that it has computed a predefined memory-bound function before providing access to said resource;
- wherein said memory-bound function comprises an algorithm that causes said client, in computing said function, to access locations in a region of memory in a random or pseudo-random way;
- wherein said algorithm causes said client to compute an inverse function $F^{-1}(\ )$ of a function $F(\ )$, wherein $F(\ )$ is a function whose domain and range are integers in the range $0 \ldots (2^n-1)$, where $2^n$ is the number of entries in said memory; and wherein $F^{-1}(\ )$ cannot be evaluated in less time than a memory access, such that said client is benefited by building a memory-based lookup table for $F^{-1}(\ )$; and
- wherein said method is implemented as follows:
  (1) let k and n be integers and $F(\ )$ a function whose domain and range are integers in the range $0 \ldots (2^n-1)$;
  (2) pick an integer $x_0$ in $0 \ldots (2^n-1)$, and for $i \in 0 \ldots (k-1)$, compute
  $$x_{i+1}=F(x_i) \text{ xor } i$$
  and a checksum of the sequence $X_0, \ldots, x_k$;
  (3) send at least some bits of $x_k$ and the checksum to said client; and
  (4) require said client to use this information to find $x_0$.

17. A system for use in connection with a plurality of computers having a range of processing power and cache sizes, for constructing and using a computational puzzle whose solution takes approximately the same amount of time on the plurality of computers, comprising:
- means for selecting a computational puzzle having a solution which is best found by a computation whose speed is limited by memory latency; and
- means for communicating information about the computational puzzle to at least one of the computers so as to cause said at least one computer to solve the puzzle in a manner causing said at least one computer to incur a computational cost;
- wherein the solution causes the at least one computer to access a pseudo-random sequence of locations in a memory array.

18. A system as recited in claim 17, wherein the computational puzzle is based on a memory bound function that is varied from time to time.

19. A system as recited in claim 17, wherein the computational puzzle is based on a memory bound function that is varied from challenge to challenge.

20. A system as recited in claim 17, wherein the at least one computer is required to show that it has computed a plurality of memory bound functions.

21. A system as recited in claim 17, wherein the memory array is significantly larger than the largest cache generally available to the plurality of computers.

22. A system as recited in claim 17, wherein the memory array to be accessed by the at least one computer has $2^n$ entries, where n is an integer, and the computational puzzle comprises a function $F(\ )$ whose domain and range are integers in the range $0 \ldots 2^n-1$, wherein $F(\ )$ is characterized in that its inverse $F^{-1}(\ )$ cannot be evaluated in less time than a memory access.

23. A system as recited in claim 17, wherein said system is implemented as follows:
  (1) let k and n be integers and $F(\ )$ a function whose domain and range are integers in the range $0 \ldots (2^n-1)$;
  (2) pick an integer $x_0$ in $0 \ldots (2^n-1)$, and for $i \in 0 \ldots (k-1)$, compute
  $$x_{i+1}=F(x_i) \text{ xor } i$$
  and a checksum of the sequence $x_0, \ldots, x_k$;
  (3) send $x_k$ and the checksum to the at least one computer; and
  (4) require the at least one computer to use this information to find $x_0$.

24. A system for use in connection with a plurality of computers having a range of processing power and cache sizes, for constructing and using a computational puzzle whose solution takes approximately the same amount of time on the plurality of computers, comprising:
- means for selecting a computational puzzle having a solution which is best found by a computation whose speed is limited by memory latency; and
- means for communicating information about the computational puzzle to at least one of the computers so as to cause said at least one computer to solve the puzzle in a manner causing said at least one computer to incur a computational cost;
- wherein said computational puzzle depends upon a password, and said solution is used as an extension to the password; and
- wherein the system comprises first and second computers having a mechanism to share a password p; wherein the second computer includes means to supplement p by picking a password extension Q, a mechanism for posing a puzzle with solution Q, wherein the puzzle is such that the first computer can solve it with moderate effort by using p but such that Q is hard to find without p; and wherein the first computer includes a mechanism to solve the puzzle by using p.

25. A system as recited in claim 24, wherein the system is further characterized as follows:
- the second computer derives a function $F(\ )$ from the password p, chooses the password extension Q, and lets a first number $x_0$ be Q;
- the second computer computes a second number $x_k$ by evaluating $F(\ )$ k times with the recurrence $x_{i+1}=F(x_i)$ xor i;
- the second computer finds a third number $x'_0$ that also maps to $x_k$ using the recurrence;
- the second computer gives to the first computer a checksum of the path from $x_0$ to $x_k$, and $x'_0$; and
- using p, the first computer derives $F(\ )$, builds a table for $F^{-1}(\ )$, computes $x_k$, then uses $x_k$ and the table to find $x_0$, which is then used as the password extension Q.

26. A system as recited in claim 24, wherein the first computer finds Q by computing a memory bound function.

27. A system as recited in claim 26, wherein the first computer uses p and Q to access password-protected information.

28. system as recited in claim 26, wherein the first computer uses p and Q to decrypt files that the second computer has previously encrypted.

29. A system for preventing abuse of a resource on a computer network, comprising:
   means for receiving a request for access to said resource from a client; and
   means for requiring said client to show that it has computed a predefined memory-bound function before providing access to said resource;
   wherein said memory-bound function comprises an algorithm that causes said client, in computing said function, to access locations in a region of memory; and
   wherein the size of said region of memory to be accessed by said client is significantly larger than the size of the largest cache of any computer on which the system might be implemented.

30. A system as recited in claim 29, wherein the function is varied from time to time.

31. A system as recited in claim 29, wherein the function is varied from challenge to challenge.

32. A system as recited in claim 29, wherein the client is required to show that it has computed a plurality of functions before it is given access to the resource.

33. A system for preventing abuse of a resource on a computer network, comprising:
   means for receiving a request for access to said resource from a client; and means for requiring said client to show that it has computed a predefined memory-bound function before providing access to said resource;
   wherein said memory-bound function comprises an algorithm that causes said client, in computing said function, to access locations in a region of memory; and
   wherein said algorithm causes said client to compute an inverse function $F^{-1}()$ of a function $F()$, wherein $F()$ is a function whose domain and range are integers in the range $0 \ldots (2^n-1)$, where $2^n$ is the number of entries in said memory; and wherein $F^{-1}()$ cannot be evaluated in less time than a memory access, such that said client is benefited by building a memory-based lookup table for $F^{-1}()$.

34. A system as recited in claim 33, wherein said system is implemented as follows:
   (1) let k and n be integers and $F()$ a function whose domain and range are integers in the range $0 \ldots (2^n-1)$;
   (2) pick an integer $x_0$ in $0 \ldots (2^n-1)$, and for $i \in 0 \ldots (k-1)$, compute
   $$x_{i+1} = F(x_i) \text{ xor } i$$
   and a checksum of the sequence $x_0, \ldots, x_k$;
   (3) send at least some bits of $x_k$ and the checksum to said client; and
   (4) require said client to use this information to find $x_0$.

35. A system as recited in claim 34, wherein multiple functions $F()$ are employed to construct $x_k$ to be presented to the client.

36. A system for preventing abuse of a resource on a computer network, comprising:
   means for receiving a request for access to said resource from a client; and
   means for requiring said client to show that it has computed a predefined memory-bound function before providing access to said resource;
   wherein the system issues a challenge to the client by: producing a keyed hash $H(k, x_0)$ of $x_0$, wherein H is a keyed hash function and k is a key not known to the client; and giving $H(k, x_0)$ to the client along with the challenge; and
   wherein the client is required to return both $X_0$ and $H(k, x_0)$, so that the system can check that the client's response is correct by recomputing $H(k, x_0)$ from k and $x_0$.

* * * * *